(12) United States Patent
Ruopp

(10) Patent No.: US 10,189,539 B2
(45) Date of Patent: Jan. 29, 2019

(54) MASTER CYLINDER DEVICE FOR A HYDRAULIC DISK BRAKE

(71) Applicant: Gustav Magenwirth GMBH & Co. KG, Bad Urach (DE)

(72) Inventor: Michael Ruopp, Berghülen (DE)

(73) Assignee: Gustav Magenwirth GmbH & Co. KG (DE)

(*) Notice: Subject to any disclaimer, the term of this patent is extended or adjusted under 35 U.S.C. 154(b) by 454 days.

(21) Appl. No.: 14/802,376

(22) Filed: Jul. 17, 2015

(65) Prior Publication Data

US 2015/0336629 A1    Nov. 26, 2015

Related U.S. Application Data

(63) Continuation of application No. PCT/EP2014/050946, filed on Jan. 17, 2014.

(30) Foreign Application Priority Data

Jan. 18, 2013   (DE) .................... 10 2013 200 824

(51) Int. Cl.
| | |
|---|---|
| B60T 7/08 | (2006.01) |
| B62L 3/02 | (2006.01) |
| B60T 11/16 | (2006.01) |
| B60T 11/236 | (2006.01) |
| B60T 11/22 | (2006.01) |

(Continued)

(52) U.S. Cl.
CPC .............. *B62L 3/023* (2013.01); *B60T 7/102* (2013.01); *B60T 11/16* (2013.01); *B60T 11/165* (2013.01); *B60T 11/22* (2013.01); *B60T 11/228* (2013.01); *B60T 11/232* (2013.01); *B60T 11/236* (2013.01); *B62K 23/06* (2013.01)

(58) Field of Classification Search
CPC ... F15B 7/10; B60T 7/10; B60T 7/102; B60T 11/228
USPC .................................................. 60/588, 594
See application file for complete search history.

(56) References Cited

U.S. PATENT DOCUMENTS

| | | | |
|---|---|---|---|
| 4,779,482 A | 10/1988 | Kawaguchi | |
| 4,963,692 A * | 10/1990 | Halabiya | B60T 11/224 60/588 |

(Continued)

FOREIGN PATENT DOCUMENTS

| | | |
|---|---|---|
| DE | 3837650 A1 | 5/1990 |
| DE | 20018705 U1 | 12/2000 |

(Continued)

OTHER PUBLICATIONS

European Search Report for Application No. 16198843.1 dated Apr. 26, 2017.

(Continued)

*Primary Examiner* — Michael Leslie
(74) *Attorney, Agent, or Firm* — Gregory L Mayback

(57) ABSTRACT

A master cylinder for a hydraulic brake comprises a compensating chamber, a cylinder in which a piston is movably disposed, a pressure chamber disposed in the cylinder and connected to the compensating chamber through at least one connecting opening, and a gasket for interrupting the connection between the pressure chamber and the compensating chamber. The gasket seals the compensating chamber and the pressure chamber against the environment.

13 Claims, 13 Drawing Sheets

(51) Int. Cl.
  *B60T 11/228*   (2006.01)
  *B60T 7/10*    (2006.01)
  *B60T 11/232*   (2006.01)
  *B62K 23/06*   (2006.01)

(56) References Cited

U.S. PATENT DOCUMENTS

| | | | |
|---|---|---|---|
| 5,050,381 A | 9/1991 | Matsuno et al. | |
| 6,003,639 A | 12/1999 | Buckley et al. | |
| 6,336,327 B1 | 1/2002 | Noro et al. | |
| 6,804,961 B2 | 10/2004 | Lumpkin | |
| 6,871,729 B2 * | 3/2005 | Huster | B60T 11/22 60/594 |
| 6,957,534 B2 | 10/2005 | Lumpkin | |
| 6,964,323 B2 | 11/2005 | Campbell | |
| 7,178,646 B2 | 2/2007 | Lumpkin | |
| 7,197,875 B2 | 4/2007 | Henifin | |
| 7,204,350 B2 | 4/2007 | Lumpkin | |
| 7,475,758 B2 | 1/2009 | Dimsey et al. | |
| 7,534,435 B2 | 5/2009 | Sallberg et al. | |
| 7,540,147 B2 * | 6/2009 | Takizawa | B60T 7/10 60/588 |
| 7,546,909 B2 | 6/2009 | Campbell et al. | |
| 7,559,414 B2 | 7/2009 | Lumpkin | |
| 7,575,105 B2 | 8/2009 | Lumpkin | |
| 7,617,913 B2 | 11/2009 | Lumpkin | |
| 7,891,645 B2 | 2/2011 | Schroeder | |
| 8,046,996 B2 * | 11/2011 | Dunlap, III | B60T 7/102 60/588 |
| 8,074,774 B2 | 12/2011 | Lumpkin | |
| 8,113,594 B2 | 2/2012 | Jones et al. | |
| 8,123,006 B1 | 2/2012 | Schroeder | |
| 8,276,477 B2 | 10/2012 | Lavezzi et al. | |
| 2003/0121736 A1 | 7/2003 | Lumpkin | |
| 2008/0116025 A1 | 5/2008 | Lumpkin | |
| 2012/0096851 A1 | 4/2012 | Lumpkin | |

FOREIGN PATENT DOCUMENTS

| | | |
|---|---|---|
| DE | 10041787 A1 | 4/2001 |
| DE | 60205573 T2 | 6/2006 |
| DE | 202008017543 U1 | 3/2010 |
| DE | 202004021891 U1 | 5/2012 |
| EP | 0621172 B1 | 6/1997 |
| EP | 1346893 A1 | 9/2003 |
| EP | 1007404 B1 | 10/2004 |
| EP | 1498347 A2 | 1/2005 |
| EP | 1498347 A3 | 2/2005 |
| EP | 1325863 B1 | 8/2005 |
| EP | 1595781 A3 | 11/2005 |
| EP | 1959782 A1 | 8/2008 |
| EP | 2110299 A1 | 10/2009 |
| EP | 1831068 B1 | 10/2010 |
| EP | 2441631 A1 | 4/2012 |
| EP | 1595781 B1 | 11/2014 |
| TW | M380905 U1 | 5/2010 |
| TW | 201219252 A | 5/2012 |
| WO | 2002058988 A1 | 8/2002 |
| WO | 2008082676 A1 | 7/2008 |
| WO | 2008093226 A2 | 8/2008 |
| WO | 2013000780 A1 | 1/2013 |

OTHER PUBLICATIONS

German Search Report for Application No. 10 2013 200 824.4 dated Nov. 14, 2013.

International Search Report for PCT/EP2014/050946 dated Jul. 30, 2014.

Office Action from Taiwanese Patent Application No. 103101987 dated Nov. 17, 2017.

* cited by examiner

MASTER CYLINDER DEVICE FOR A HYDRAULIC DISK BRAKE

CROSS-REFERENCE TO RELATED APPLICATIONS

This is a continuing application, under 35 U.S.C. § 120, of copending international application No. PCT/EP2014/050946, filed Jan. 17, 2014, which designated the United States and was not published in English; this application also claims the priority, under 35 U.S.C. § 119, of German Patent Application Nos. 10 2013 200 824.4, filed Jan. 18, 2013; the prior applications are herewith incorporated by reference in their entirety.

STATEMENT REGARDING FEDERALLY SPONSORED RESEARCH OR DEVELOPMENT

Not Applicable

FIELD OF THE INVENTION

The present systems and methods lies in the field of brakes. The present disclosure relates to a master cylinder for a hydraulic disk brake and/or a hydraulic disk brake including such a master cylinder, in particular, for handlebar-steered vehicles and/or bicycles and/or motorbikes.

BACKGROUND OF THE INVENTION

The known master cylinders for hydraulic disk brakes usually contain a compensating chamber for hydraulic medium so that hydraulic medium from the compensating chamber can flow into the rest of the braking system when the brake pad wear increases. In addition, it is possible to balance changes in volume caused in particular by temperature fluctuations, where such changes can occur in powerful and long braking operations in which the hydraulic medium can get hot.

Braking systems that have a compensating chamber for hydraulic medium are referred to as open systems. In the known master cylinders, a piston is movably disposed in a cylindrical chamber. A pressure chamber is provided in the cylindrical chamber and is confined by the piston. The pressure chamber is connected to the compensating chamber through a connecting opening. The connection between the pressure chamber and the compensating chamber can be interrupted through a gasket (primary gasket) as soon as the secondary gasket travels over the connecting opening as a result of the piston movement.

A gasket (secondary gasket) is provided between the piston and the cylinder wall of the cylindrical chamber and seals the pressure chamber and the compensating chamber against the environment.

The pressure chamber is connected to a slave (in the case of disk brakes: the brake caliper) through a pressure line. The hydraulic medium is pressurized by the movement of the piston along the main axis of the cylinder as soon as the connection between the pressure chamber and the compensating chamber is interrupted.

The known master cylinders have the drawback that they are made so as to have a relatively elongated design along the cylinder axis, which is due to the necessity of providing both a primary gasket and a secondary gasket. As a result, the master cylinder is relatively large and heavy. Particularly in the case of radial mountings where the cylinder axis extends perpendicularly to the axis of the handlebar and/or of inclined radial mountings in which the cylinder axis extends at an angle of less than 90 degrees, this yields a relatively large installation space and, thus, results in a relatively large distance between the handlebar and the center of rotation about which the lever of the brake fitting rotates when the master cylinder is actuated.

Thus, a need exists to overcome the problems with the prior art systems, designs, and processes as discussed above.

SUMMARY OF THE INVENTION

The systems and methods described provide a master cylinder for a hydraulic disk brake that overcomes the hereinafore-mentioned disadvantages of the heretofore-known devices and methods of this general type and that provide such features with a very compact design along the cylinder axis.

According to an exemplary embodiment, a master cylinder for a hydraulic brake is provided, which comprises a compensating chamber, a cylinder in which a piston is disposed so as to be movable, a pressure chamber which is disposed in the cylinder and which is connected to the compensating chamber via at least one connecting opening, and a gasket for interrupting the connection between the pressure chamber and the compensating chamber, wherein the gasket seals the compensating chamber and the pressure chamber against the environment.

This embodiment has the advantage that the gasket has a dual function, i.e., the gasket fulfills the function of the primary gasket that interrupts the connection between the pressure chamber and the compensating chamber as soon as the piston has traveled a certain distance towards the pressure chamber, and simultaneously fulfills the function of the secondary gasket that always seals the compensating chamber and the pressure chamber against the environment. This leads to the advantage that the master cylinder can have a relatively short structure in the direction in which the piston moves upon actuation. In particular, this is the case with respect to known master cylinders where the primary gasket and the secondary gasket are disposed on the piston at a distance along the axis of the piston or the cylinder. As a result of the inventive arrangement, it is possible to avoid the axial installation space (i.e., the installation space along the direction of the cylinder or piston axis) of what is called the secondary area between the primary gasket and the secondary gasket.

In accordance with another feature, the gasket can seal the compensating chamber against the environment when the gasket has interrupted the connection between the pressure chamber and the compensating chamber.

In accordance with another feature, the piston can have a piston wall that extends from a piston bottom and at the end of which the gasket is disposed.

In accordance with another feature, a hollow connecting piece can be disposed in the cylinder, the connecting piece plunging into the piston.

In accordance with another feature, the return spring can be disposed in a section of the compensating chamber.

In accordance with another feature, the ratio of the length of the piston to the diameter of the piston can be approximately 3/6 to 4/3.

According to an exemplary embodiment, a master cylinder for a hydraulic brake is provided, which comprises a compensating chamber, a cylinder in which a piston is disposed so as to be movable, a pressure chamber which is disposed in the cylinder and which is connected to the compensating chamber via at least one connecting opening, and a gasket for interrupting the connection between the pressure chamber and the compensating chamber, wherein the gasket seals the compensating chamber against the environment when the gasket has interrupted the connection between the pressure chamber and the compensating chamber.

This combination of features yields the above-described advantage that the gasket complies with the above-described functions of the primary gasket and the secondary gasket. Because the gasket seals the compensating chamber against the environment after the interruption of the connection between the pressure chamber and the compensating chamber as well, the gasket also takes over the function of the secondary gasket known to a person skilled in the art. Therefore, the master cylinder can be made so as to have a relatively short structure as explained above.

In accordance with another feature, the gasket can seal the compensating chamber and the pressure chamber against the environment.

In accordance with another feature, the piston can have a piston wall which extends from a piston bottom and at the end of which the gasket is disposed.

In accordance with another feature, a hollow connecting piece can be disposed in the cylinder, the connecting piece plunging into the piston.

In accordance with another feature, the return spring can be disposed in a section of the compensating chamber.

In accordance with another feature, the ratio of the length of the piston to the diameter of the piston can be approximately 3/6 to 4/3.

According to an exemplary embodiment, a master cylinder for a hydraulic brake is provided, which comprises a compensating chamber, a cylinder in which a piston is disposed to as to be movable, a pressure chamber which is disposed in the cylinder and which is connected to the compensating chamber via at least one connecting opening, and a gasket for interrupting the connection between the pressure chamber and the compensating chamber, wherein the piston has a piston wall which extends from a piston bottom and at the end of which the gasket is disposed.

This combination of features yields the above-described advantage that the gasket can comply with the above-described functions of the primary gasket and the secondary gasket. Because only one gasket is required, the master cylinder can have a relatively short structure as explained above.

In accordance with another feature, the gasket can seal the compensating chamber and the pressure chamber against the environment.

In accordance with another feature, the gasket can seal the compensating chamber against the environment when the gasket has interrupted the connection between pressure chamber and compensating chamber.

In accordance with another feature, a hollow connecting piece can be disposed in the cylinder, the connecting piece plunging into the piston. According to the invention, the gasket can act as a membrane.

In accordance with another feature, the return spring can be disposed in a section of the compensating chamber.

In accordance with another feature, the ratio of the length of the piston to the diameter of the piston can be approximately 3/6 to 4/3.

According to an exemplary embodiment, a master cylinder for a hydraulic brake is provided, the master cylinder having a compensating chamber and a cylinder in which a piston is disposed so as to be movable against the force of a return spring, wherein a hollow connecting piece is disposed in the cylinder, the connecting piece plunging into the piston.

This combination of features yields the advantage that a gasket can be provided that complies with the function of the primary gasket and the secondary gasket. For example, a gasket can be provided that seals between the inner wall of the cylinder and the outer wall of the connecting piece. When a connecting opening between the pressure chamber and the compensating chamber is provided in the connecting piece, the connection between the pressure chamber and the compensating chamber is interrupted as soon as the gasket travels over the connecting opening. Having traveled over the connecting opening, the gasket thus seals the pressure chamber against not only the environment but also the compensating chamber. In a further actuation of the master cylinder, a pressure is thus built up in the system.

In accordance with another feature, a pressure chamber disposed in the cylinder can be connected to the compensating chamber through at least one connecting opening, wherein a gasket can be provided for interrupting the connection between the pressure chamber and the compensating chamber.

In accordance with another feature, the gasket can seal the compensating chamber and the pressure chamber against the environment.

In accordance with another feature, the gasket can seal the compensating chamber against the environment when the gasket has interrupted the connection between pressure chamber and compensating chamber.

In accordance with another feature, the return spring can be disposed in a section of the compensating chamber.

In accordance with another feature, the piston can have a piston wall that extends from a piston bottom and at the end of which the gasket is disposed.

In accordance with another feature, the piston can be cup-shaped.

In accordance with another feature, the piston can have a piston bottom and a piston wall. When the master cylinder is actuated, a pressure piece can act on the piston bottom to displace the piston into the cylinder, wherein the connecting piece plunges into the space enclosed by the piston wall.

In accordance with another feature, a gasket can be provided for interrupting the connection between the pressure chamber and the compensating chamber.

In accordance with another feature, the gasket can be disposed on the end side of the piston wall (the piston wall side opposite to the piston bottom) of the piston.

In accordance with another feature, the pressure chamber can be defined by the cylinder wall, the cylinder bottom, the connecting piece and the gasket. The advantage of this configuration is that the hydraulic liquid does not contact the piston and, therefore, when the material of the piston is selected, no attention has to be paid to the fact that the piston is resistant to the hydraulic liquid.

In accordance with another feature, the gasket can have two sealing lips. In this connection, one sealing lip can, based on the cylinder, seal outwards (against the cylinder wall) and the other sealing lip can seal inwards (against the outer wall of the connecting piece).

In accordance with another feature, a pressure chamber disposed in the cylinder can be connected to the compensating chamber through at least one connecting opening.

In accordance with another feature, the connecting opening between the pressure chamber and the compensating chamber can be directed inwards or be formed in the connecting piece.

In accordance with another feature, at least one section of the compensating chamber can be provided in the piston and the connecting piece.

In accordance with another feature, the pressure chamber can enclose the connecting piece.

In accordance with another feature, at least one connecting opening for connecting the pressure chamber to the compensating chamber can be provided in the connecting piece.

In accordance with another feature, the outer diameter of the connecting piece can be smaller in an area that is closer to the piston than the outer diameter of the connecting piece in an area that is farther away from the piston.

In accordance with another feature, a mild step or a gradual transition from the area having the smaller outer diameter to the area having the larger outer diameter can be provided in the outer wall of the connecting piece.

In accordance with another feature, the inner diameter of the cylinder wall of the cylinder can be larger in an area that is closer to the piston than the inner diameter of the cylinder wall in an area that is farther away from the piston.

In accordance with another feature, a mild step or a gradual transition from the area having the larger inner diameter to the area having the smaller inner diameter can be provided in the inner wall of the cylinder.

In accordance with another feature, the transitions from the outer diameter of the connecting piece and the inner diameter of the cylinder can be formed, based on the axial direction of the cylinder or the connecting piece at an equal height or be slightly staggered to one another. When the transitions are slightly staggered, the transitions can be staggered relative to one another by approximately 0.1 to 2 mm, in particular, by approximately 0.2 to 1.5 mm, further by approximately 0.3 to 1.0 mm, and, in particular, by approximately 0.5 mm. The transition of the inner diameter of the cylinder wall here can be closer to the piston. Alternatively, the transition of the outer diameter of the connecting piece can be closer to the piston.

According to an exemplary embodiment, a master cylinder for a hydraulic brake is provided, the master cylinder having a compensating chamber and a cylinder in which a piston is disposed so as to be movable against the force of a return spring, wherein the return spring is disposed in a section of the compensating chamber.

This combination of features yields the advantage that the pressure chamber can be better vented so as to be better kept free from air bubbles. Air bubbles that possibly adhere to the return spring stay in the compensating chamber and, thus, cannot cause any power drop in the pressure chamber when a pressure is built up.

In accordance with another feature, a pressure chamber disposed in the cylinder can be connected to the compensating chamber via at least one connecting opening, wherein a gasket can be provided to interrupt the connection between the pressure chamber and the compensating chamber.

In accordance with another feature, the return spring can be at least partially disposed in the piston.

In accordance with another feature, the return spring can be at least partially disposed in the hollow connecting piece.

In accordance with another feature, part of the compensating chamber can be disposed in the piston.

In accordance with another feature, part of the compensating chamber can be disposed in the hollow connecting piece.

In accordance with another feature, the gasket can seal the compensating chamber and the pressure chamber against the environment.

In accordance with another feature, the gasket can seal the compensating chamber against the environment when the gasket has interrupted the connection between pressure chamber and compensating chamber.

In accordance with another feature, the piston can have a piston wall which extends from a piston bottom and at the end of which the gasket is disposed.

In accordance with another feature, a hollow connecting piece can be disposed in the cylinder, the connecting peace plunging into the cylinder.

In accordance with another feature, the ratio of the length of the piston to the diameter of the piston can be approximately 3/6 to 4/3.

According to an exemplary embodiment, a master cylinder for a hydraulic brake is provided, the master cylinder having a compensating chamber and a cylinder in which a piston is disposed so as to be movable against the force of a return spring, wherein the ratio of the length of the piston to the diameter of the piston is approximately 3/6 to 4/3.

In accordance with another feature, the ratio of the length of the piston to the diameter of the piston or the ratio of the length of the distance from the guiding portion to the scraper to the diameter of the piston can be approximately 3/5 to 1 and, in particular, approximately 3/4.

In accordance with another feature, the return spring can be disposed in a section of the compensating chamber.

In accordance with another feature, a pressure chamber disposed in the cylinder can be connected to the compensating chamber through at least one connecting opening, wherein a gasket can be provided for interrupting the connection between the pressure chamber and the compensating chamber.

In accordance with another feature, the gasket can seal the compensating chamber and the pressure chamber against the environment.

In accordance with another feature, the gasket can seal the compensating chamber against the environment when the gasket has interrupted the connection between the pressure chamber and the compensating chamber.

In accordance with another feature, the piston can have a piston wall that extends from a piston bottom and at the end of which the gasket is disposed.

In accordance with another feature, a hollow connecting piece can be disposed in the cylinder, the connecting piece plunging into the piston.

In accordance with another feature, a leg spring can be provided in the different exemplary embodiments and biasing the brake lever in the direction of the piston. In this connection, the brake lever can be hinged so that it can fold away counter to the normal actuation direction.

In accordance with another feature, the pressure chamber can have a low-pressure chamber and a high-pressure chamber. In this connection, the low-pressure chamber and the high-pressure chamber can be connected to each other through a channel that is closed with a certain lift when the master cylinder is actuated. The effective cross-section of the pressure chamber in the case of an open connection between the low-pressure chamber and the high-pressure chamber here can be greater than the effective cross-section of the high-pressure chamber. Here, the low-pressure chamber can be connected to the compensating chamber through a pressure relief valve device and, optionally, a check valve device.

Also provided is a master cylinder for a hydraulic disk brake comprising a pressure point adjusting device and/or a hydraulic disk bake including such a master cylinder, in particular for handlebar-steered vehicles and/or bicycles and/or motorbikes.

In known master cylinders of open brake systems, to have the system operate virtually as a closed system by adjusting the pressure point is usually avoided. Therefore, the pressure point adjusting device of known master cylinders are designed to ensure that the connection between the compensating chamber and the pressure chamber is not interrupted in any position of the pressure point adjusting device. The drawback of this is that a master cylinder must have a relatively long structure because a certain safety related to manufacturing tolerances is taken into account. Particularly in the case of radial fittings, this is a drawback because it is aspired in this case to arrange the pivot point as close as possible to the handlebar.

It is therefore a desire of the instant embodiments to provide a master cylinder that can be constructed as a radial fitting having the smallest possible distance to the handlebar. This advantage is achieved by a master cylinder described herein.

According to an exemplary embodiment, a master cylinder for a hydraulic brake is provided, the master cylinder having a compensating chamber, a cylinder in which a piston is disposed so as to be movable, a pressure chamber which is disposed in the cylinder and which is connected to the compensating chamber via at least one connecting opening, a gasket for interrupting the connection between the pressure chamber and the compensating chamber, and a pressure point adjusting device, wherein the pressure point adjusting device is configured and disposed so as to interrupt the connection between the compensating chamber and the pressure chamber in the rest position.

In accordance with another feature, the pressure point adjusting device can have a locking device.

In accordance with another feature, the locking device can be configured and disposed so as not to interrupt the connection between the compensating chamber and the pressure chamber in the rest position when the locking device is in a locked position.

In accordance with another feature, the master cylinder can have a brake lever and a pressure piece, wherein, when the brake is actuated, the force is transmitted from the brake lever through the pressure piece to the piston.

In accordance with another feature, the pressure point adjusting device can be configured and disposed such that the pressure point of the master cylinder can be adjusted by turning the brake lever jointly with the pressure piece with respect to the housing of the master cylinder about a bearing journal.

In accordance with another feature, the pressure point adjusting device can have a journal that includes a contour section and an actuation head. In this connection, the journal can be rotatably configured for pressure point adjustment at the actuation head. In this connection, the central portion of the journal can have a contour portion where the pressure piece abuts. Here, the angular position of the pressure piece can be changed by turning the journal, thus changing the zero point position of the piston in the cylinder and, thus, the pressure point of the master cylinder.

In accordance with another feature, the contour portion thus can be configured such that, in its rest position, the piston is slidable into the cylinder to such an extent that the connection between the compensating chamber and the pressure chamber is interrupted. In this connection, the journal can have a locking device and, in particular, detent cams. The locking device and/or detent cams here can engage in corresponding contours in the housing to ensure that the pressure point cannot be adjusted so as to interrupt the connection between pressure chamber and compensating chamber in the rest position of the piston.

In accordance with another feature, the master cylinder can also have a handle width adjusting device for adjusting the handle width of the master cylinder. The handle width adjusting device can be configured and disposed so as to adjust the angular distance between the pressure piece and the brake lever, in particular, both disposed about a joint bearing journal.

The handle width adjusting device can have a journal that is screwed into the brake lever by the external thread thereof, i.e., into an internal thread provided in the brake lever. The handle width adjusting device here can be configured and disposed so as to adjust by rotating the journal the relative position thereof in the brake lever and, thus, the angular distance between the brake lever and the pressure piece causing the handle width.

In accordance with another feature, the master cylinder can be configured and disposed to simultaneously adjust the handle width when the pressure point is adjusted.

Also provided in an exemplary embodiment is a master cylinder for a hydraulic disk brake including a pressure point adjusting device and/or a hydraulic disk brake including such a master cylinder, in particular for handlebar-steered vehicles and/or bicycles and/or motorbikes.

According to an exemplary embodiment, a master cylinder for a hydraulic brake is provided, which comprises a compensating chamber, a cylinder in which a piston is disposed so as to be movable, and a pressure chamber which is disposed in the cylinder and which is connected to the compensating chamber through at least one connecting opening, wherein the compensating chamber has a cover, wherein the cover has a projection which protrudes beyond the piston. The advantage of this configuration is that the cover has a dual function because it serves for confining the path of the piston when the cover closes the compensating chamber.

Although the systems and methods are illustrated and described herein as embodied in a master cylinder for a hydraulic disk brake, it is, nevertheless, not intended to be limited to the details shown because various modifications and structural changes may be made therein without departing from the spirit of the invention and within the scope and range of equivalents of the claims. Additionally, well-known elements of exemplary embodiments will not be described in detail or will be omitted so as not to obscure the relevant details of the systems and methods.

Additional advantages and other features characteristic of the systems and methods will be set forth in the detailed description that follows and may be apparent from the detailed description or may be learned by practice of exemplary embodiments. Still other advantages of the systems and methods may be realized by any of the instrumentalities, methods, or combinations particularly pointed out in the claims.

Other features that are considered as characteristic for the systems and methods are set forth in the appended claims. As required, detailed embodiments of the systems and methods are disclosed herein; however, it is to be understood that the disclosed embodiments are merely exemplary of the systems and methods, which can be embodied in various forms. Therefore, specific structural and functional details disclosed herein are not to be interpreted as limiting, but merely as a basis for the claims and as a representative basis for teaching one of ordinary skill in the art to variously employ the systems and methods in virtually any appropriately detailed structure. Further, the terms and phrases used herein are not intended to be limiting; but rather, to provide an understandable description of the systems and methods. While the specification concludes with claims defining the systems and methods of the invention that are regarded as novel, it is believed that the systems and methods will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the systems and methods. Advantages of embodiments of the systems and methods will be apparent from the following detailed description of the exemplary embodiments thereof, which description should be considered in conjunction with the accompanying drawings in which.

Figure 1:
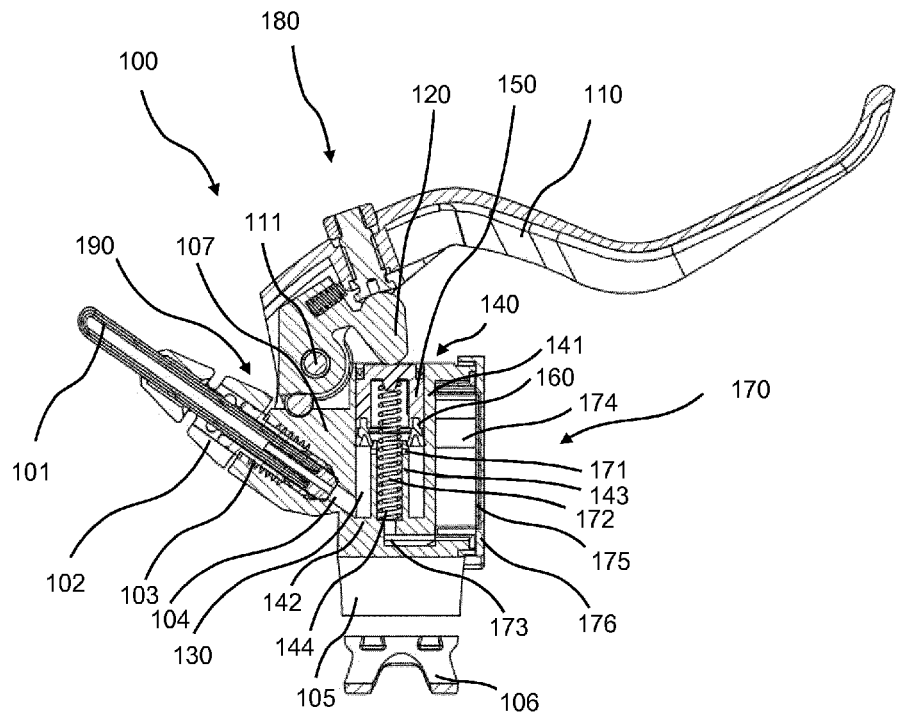
FIG. 1 is a cross-sectional view of an exemplary embodiment of a master cylinder along section line I-I of FIG. 2.
Figure 2:
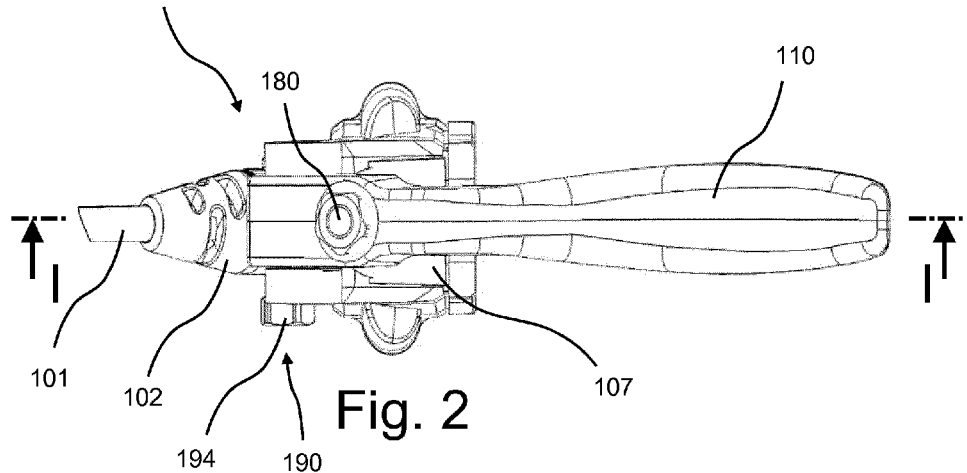
FIG. 2 is a fragmentary, top plan view of the master cylinder of FIG. 1.
Figure 3:
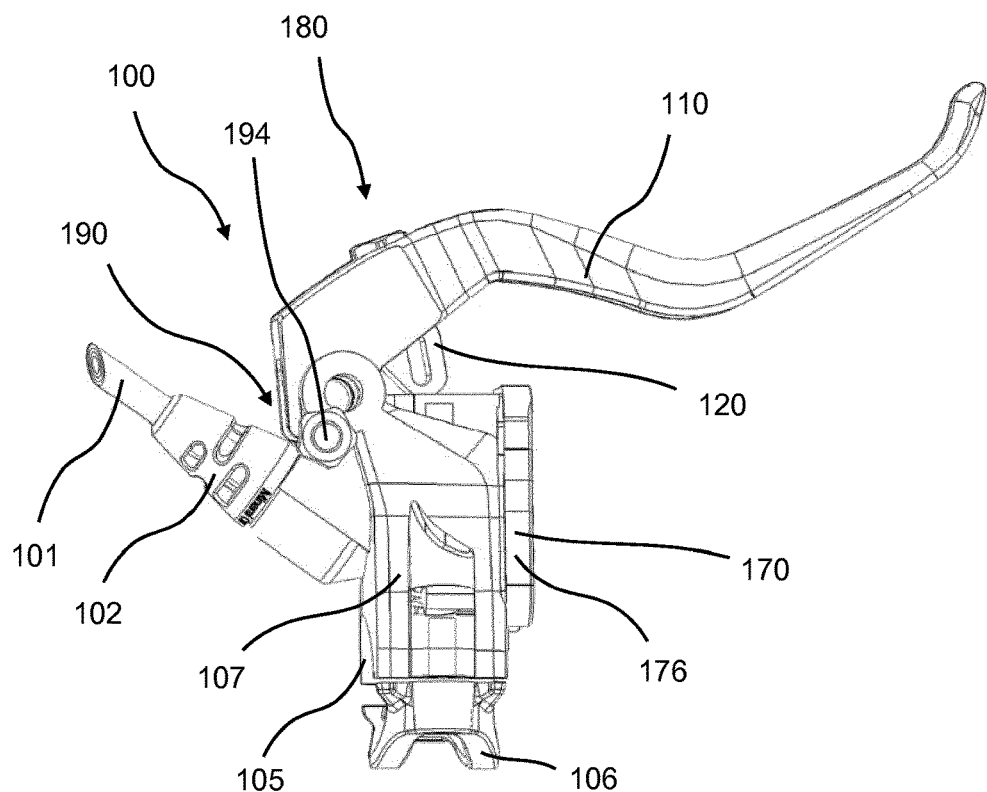
FIG. 3 is a fragmentary, side elevational view of the master cylinder of FIG. 1.
Figure 4:
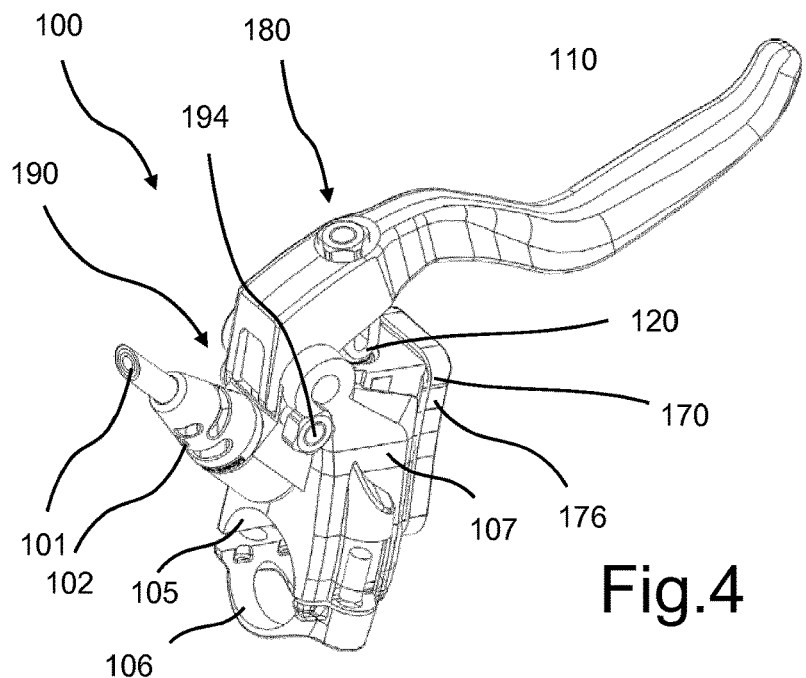
FIG. 4 is a fragmentary, perspective view of the master cylinder of FIG. 1.
Figure 5:
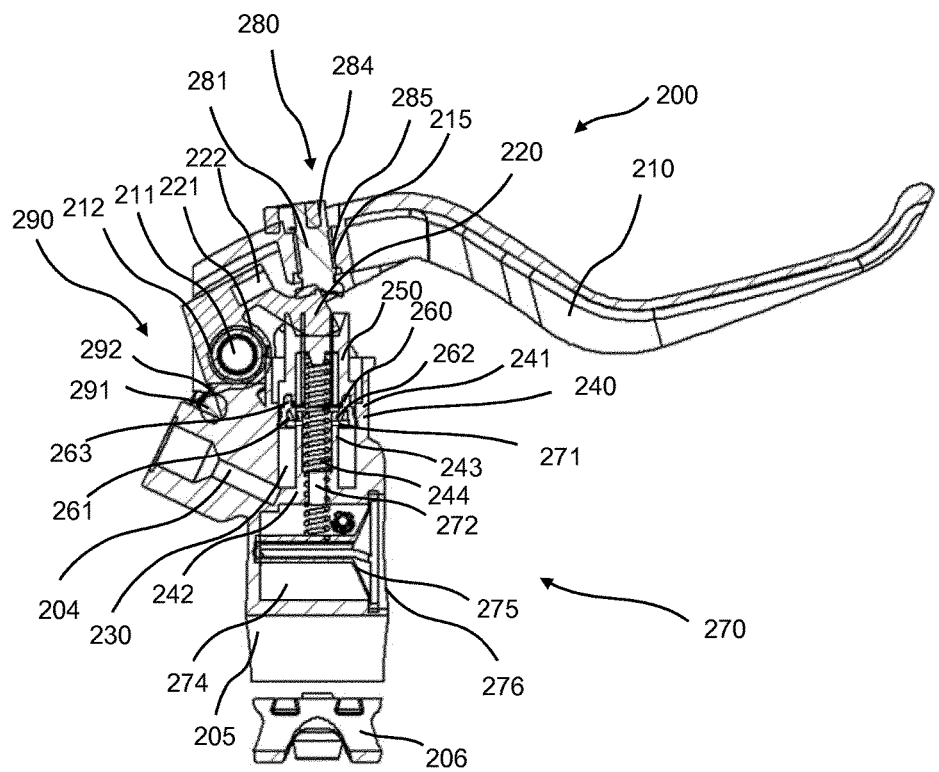
FIG. 5 is a cross-sectional view of an exemplary embodiment of a master cylinder along section line V-V of FIG. 6.
Figure 6:
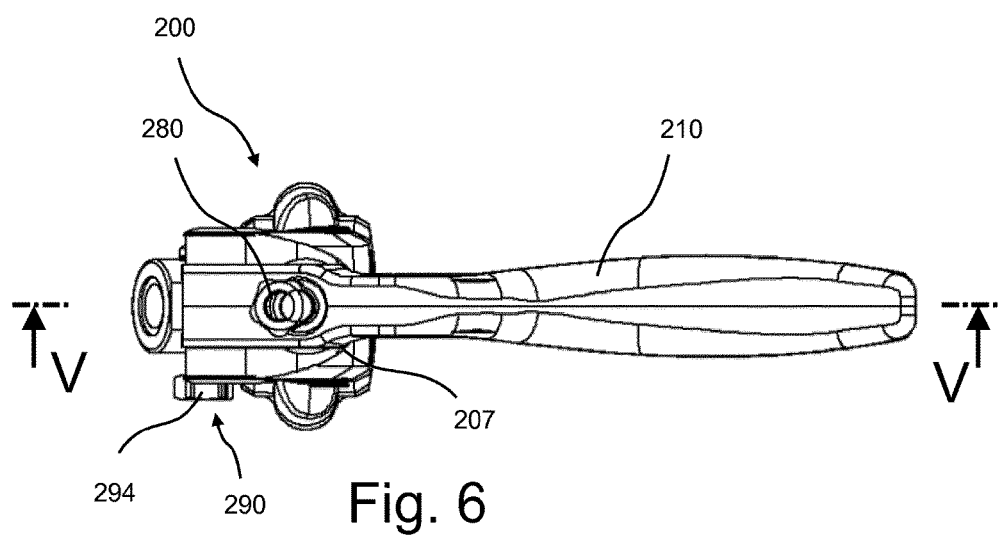
FIG. 6 is a top plan view of the master cylinder of FIG. 5.
Figure 7:
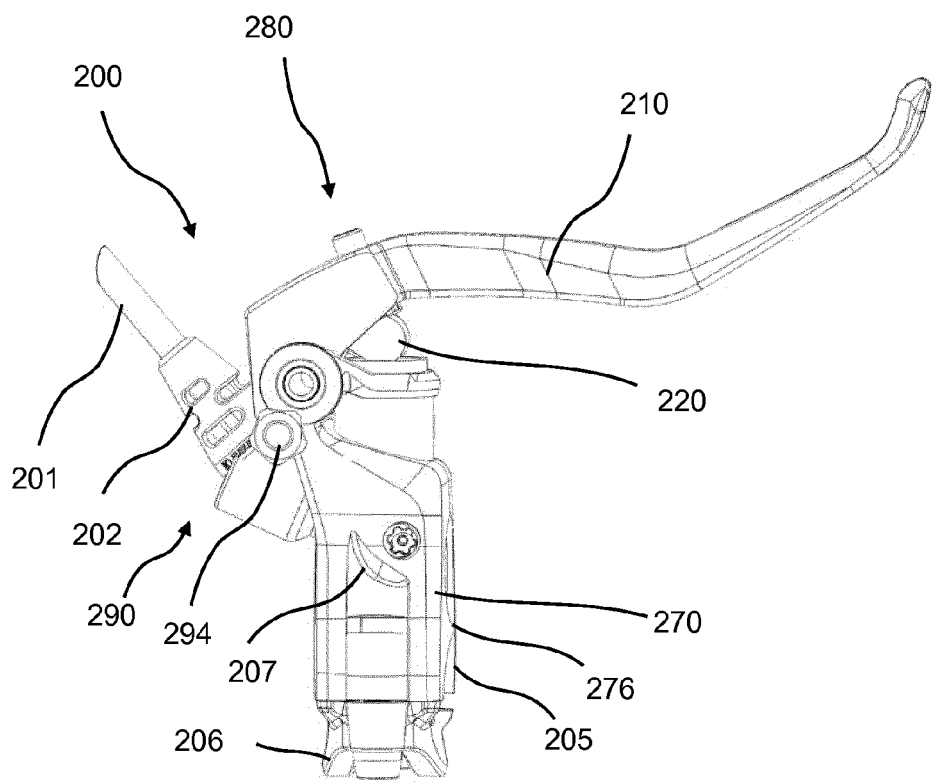
FIG. 7 is a fragmentary, side elevational view of the master cylinder of FIG. 5.
Figure 8:
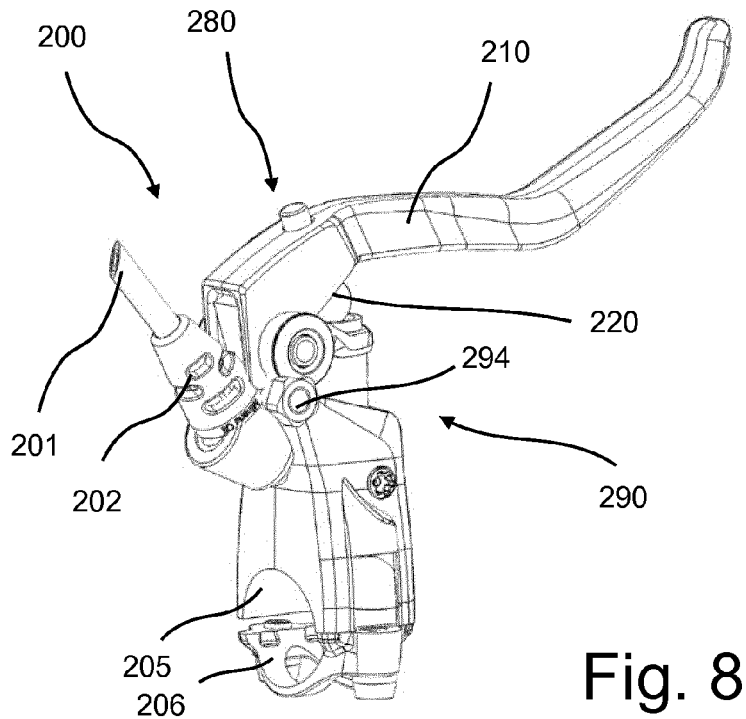
FIG. 8 is a fragmentary, perspective view of the master cylinder of FIG. 5.
Figure 9:
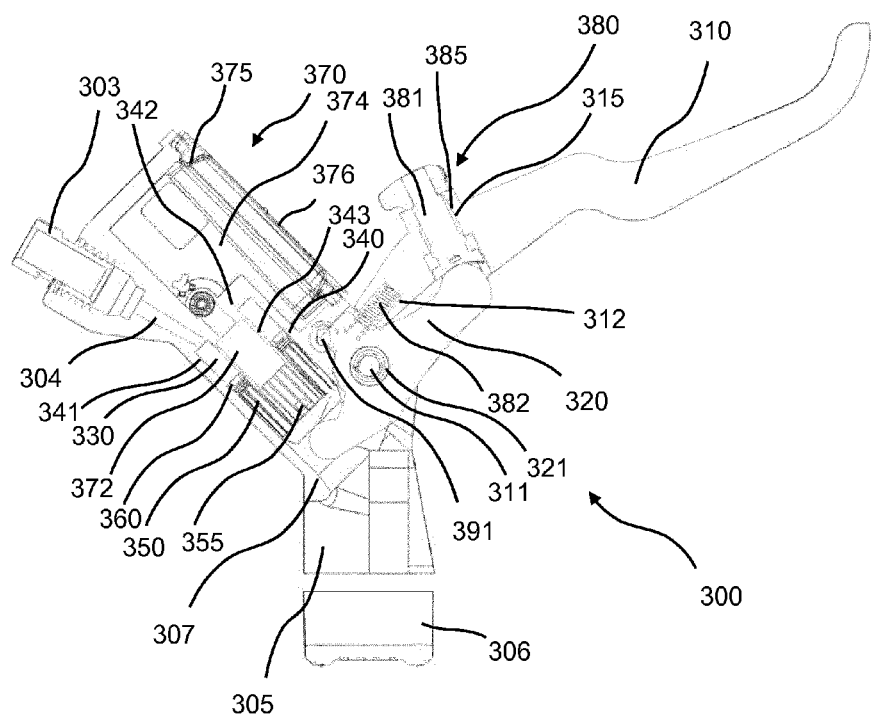
FIG. 9 is a cross-sectional view of an exemplary embodiment of a master cylinder along line IX-IX of FIG. 10.
Figure 10:
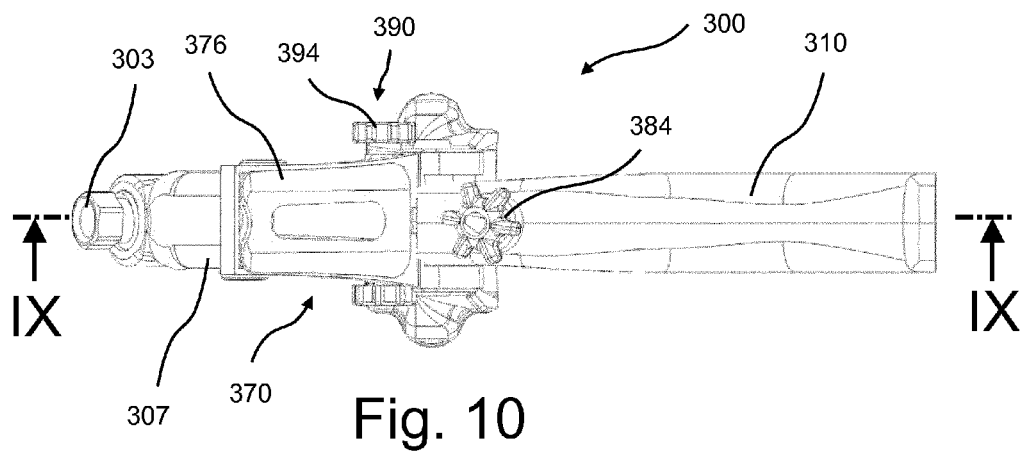
FIG. 10 is a top plan view of the master cylinder of FIG. 9.
Figure 11:
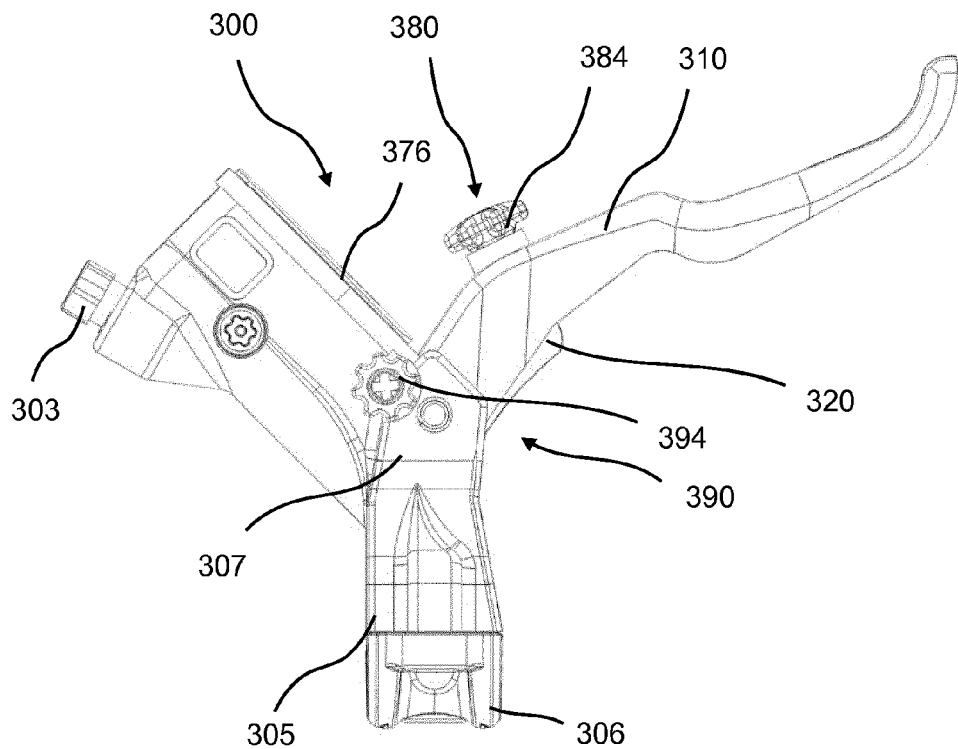
FIG. 11 is a side elevational view of the master cylinder of FIG. 9.
Figure 12:
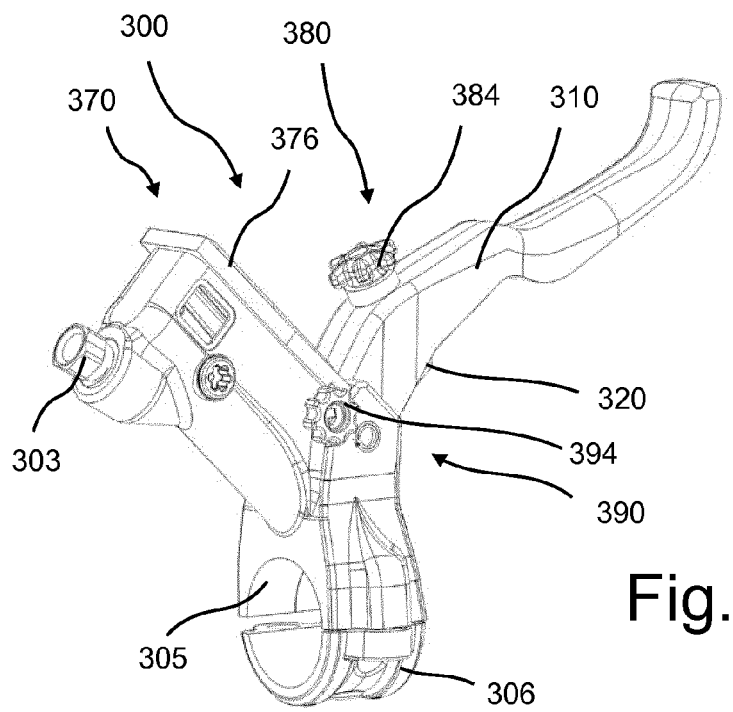
FIG. 12 is a perspective view of the master cylinder of FIG. 9.
Figure 13:
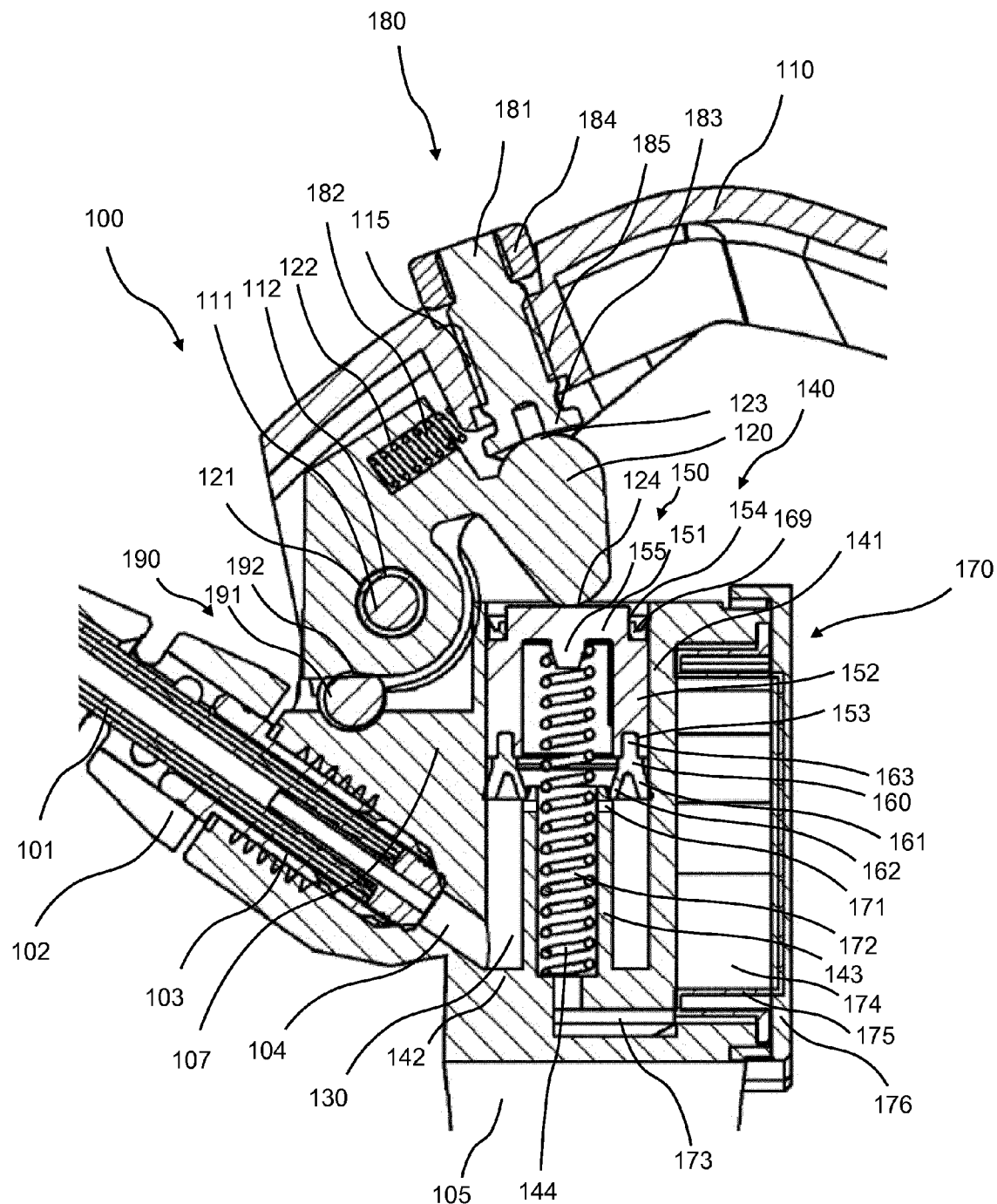
FIG. 13 is a fragmentary, enlarged, cross-sectional view of a handle width adjustment device of the master cylinder of FIG. 1.
Figure 14:
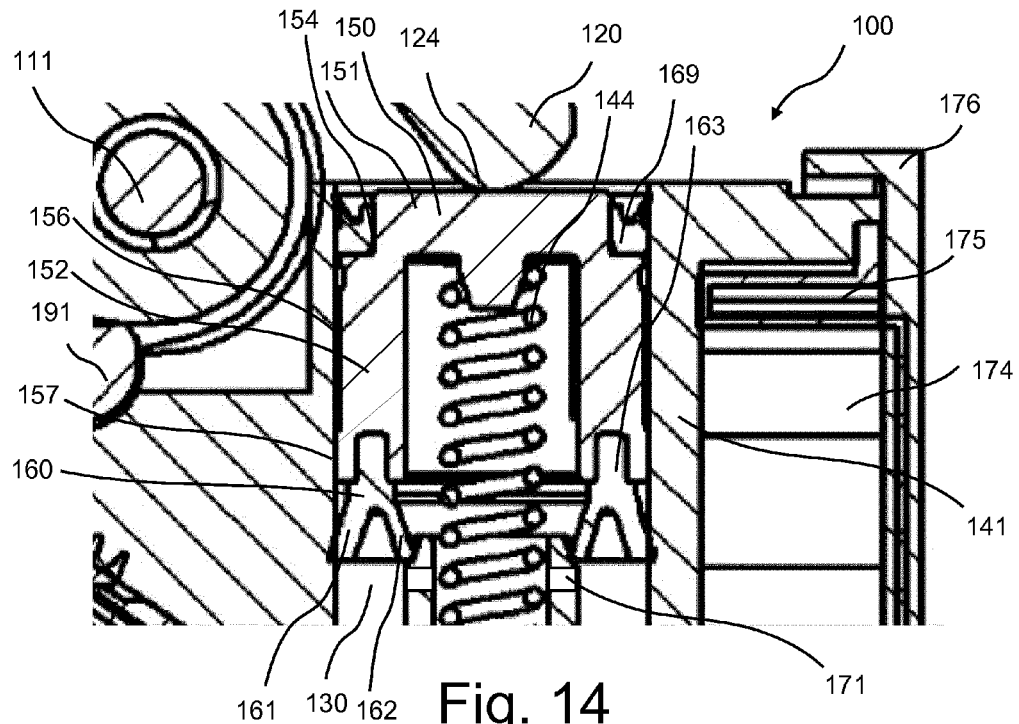
FIG. 14 a fragmentary, enlarged, cross-sectional view of a piston and a gasket of FIG. 1.

The following reference signs are used in the description of the exemplary embodiments:

100 master cylinder
101 hydraulic line
102 sleeve
103 pressure line connecting piece
104 line
105 handlebar support
106 counterpart
107 housing
110 brake lever
111 bearing journal
112 bearing journal support
115 internal thread
120 pressure piece
121 bearing journal support
122 spring support
123 journal abutment surface
124 piston abutment surface
130 pressure chamber
140 cylinder
141 cylinder wall
142 cylinder bottom
143 connecting piece
144 return spring
150 piston
151 piston bottom
152 piston wall
153 gasket support
154 scraper support
155 spring support
156 taper
157 guiding portion
160 gasket
161 sealing lip (outer)
162 sealing lip (inner)
163 mounting portion
169 scraper
170 compensating chamber
171 connecting opening
172 inner space
173 line
174 container
175 bellows
176 cover
180 handle width adjustment device
181 journal
182 spring
183 abutment surface
184 actuation head
185 external thread
190 pressure point adjustment device
191 journal
192 contour portion
194 actuation head
200 master cylinder
201 hydraulic line
202 sleeve
204 line
205 handlebar support
206 counterpart 207 housing
210 brake lever
211 bearing journal
212 bearing journal support
215 internal thread
220 pressure piece
221 bearing journal support
222 spring support
230 pressure chamber
240 cylinder
241 cylinder wall
242 cylinder bottom
243 connecting piece
244 return spring
250 piston
260 gasket
261 sealing lip (outer)
262 sealing lip (inner)
263 mounting portion
270 compensating chamber
271 connecting opening
272 inner space
274 container
275 bellows
276 cover
280 handle width adjustment device
281 journal
284 actuation head
285 external thread
290 pressure point adjustment device
291 journal
294 actuation head
300 master cylinder
303 pressure line connecting piece
304 line
305 handlebar support
306 counterpart
307 housing
310 brake lever
311 bearing journal
312 spring support
315 internal thread
320 pressure piece
321 bearing journal support
330 pressure chamber
340 cylinder
341 cylinder wall
342 cylinder bottom
343 connecting piece
350 piston
355 spring support
360 gasket
370 compensating chamber
372 inner space
374 container
375 bellows
376 cover
380 handle width adjustment device
381 journal
382 spring
384 actuation head
385 external thread
390 pressure point adjustment device
391 journal
394 actuation head
400 master cylinder
401 hydraulic line
402 sleeve
403 pressure line connecting piece
404 line
405 handlebar support
407 housing
410 brake lever
411 bearing journal
420 pressure piece
424 piston abutment surface
430 pressure chamber
440 cylinder
441 cylinder wall
4411 area having a larger inner diameter
4412 area having a smaller inner diameter
442 cylinder bottom
443 connecting piece
4431 area having a smaller outer diameter
4432 area having a larger outer diameter
444 return spring
450 piston
451 piston bottom
452 piston wall
453 gasket support
454 scraper support
455 spring support
456 taper
457 guiding portion
460 gasket
461 sealing lip (outer)
462 sealing lip (inner)
463 mounting portion
468 pin (for confining the piston movement)
469 scraper
470 compensating chamber
471 connecting opening
472 inner space
473 line
474 container
475 bellows
476 cover
490 pressure point adjustment device
491 journal
492 contour portion
500 master cylinder
501 hydraulic line
502 sleeve
503 pressure line connecting piece
504 line
505 handlebar support
506 counterpart
507 housing
510 brake lever
511 bearing journal
512 bearing journal support
515 internal thread
520 pressure piece
521 bearing journal support
522 spring support
523 journal abutment surface
524 piston abutment surface
529 journal abutment surface
530 pressure chamber
540 cylinder
541 cylinder wall
542 cylinder bottom
543 connecting piece
544 return spring 550 piston
551 piston bottom
552 piston wall
553 gasket support
554 scraper support
555 spring support
556 taper
557 guiding portion
560 gasket
561 sealing lip (outer)
562 sealing lip (inner)
563 mounting portion
569 scraper
570 compensating chamber
571 connecting opening
572 inner space
573 line
574 container
575 bellows
576 cover
5761 projection
5762 locking portion
5763 locking portion
580 handle width adjustment device
581 journal
582 spring
583 abutment surface
584 actuation head
585 external thread
590 pressure point adjustment device
591 journal
592 contour portion
593 locking cam
594 actuation head
600 master cylinder
601 hydraulic line
602 sleeve
603 pressure line connecting piece
604 line
605 handlebar support
606 counterpart
607 housing
610 brake lever
615 internal thread
620 pressure piece
630 pressure chamber
640 cylinder
641 cylinder wall
642 cylinder bottom
643 connecting piece
650 piston
655 spring support
660 gasket
661 sealing lip (outer)
662 sealing lip (inner)
670 compensating chamber
671 connecting opening
672 inner space
673 line
674 container
675 bellows
676 cover
6761 projection
6762 locking pin
6763 hinge
6764 holding projection
680 handle width adjustment device
681 journal
685 external thread
700 master cylinder
704 line
705 handlebar support
707 housing
730 pressure chamber
740 cylinder
741 cylinder wall
742 cylinder bottom
743 connecting piece
744 spring
750 piston
757 guiding portion
760 gasket
761 sealing lip (outer)
762 sealing lip (inner)
770 compensating chamber
771 connecting opening
772 inner space
774 container
800 master cylinder
804 line
805 handlebar support
807 housing
830 pressure chamber
831 high-pressure chamber
832 channel
833 low-pressure chamber
834 connecting opening
835 valve
840 cylinder
841 cylinder wall
842 cylinder bottom
843 connecting piece
844 spring
850 piston
852 piston wall
857 guiding portion
858 collar
859 gasket support
860 gasket
861 sealing lip (outer)
862 sealing lip (inner)
870 compensating chamber
871 connecting opening
872 inner space
874 container
877 inner space
880 gasket.

DETAILED DESCRIPTION OF THE INVENTION

As required, detailed embodiments of the systems and methods are disclosed herein; however, it is to be understood that the disclosed embodiments are merely exemplary of the systems and methods, which can be embodied in various forms. Therefore, specific structural and functional details disclosed herein are not to be interpreted as limiting, but merely as a basis for the claims and as a representative basis for teaching one skilled in the art to variously employ the systems and methods in virtually any appropriately detailed structure. Further, the terms and phrases used herein are not intended to be limiting; but rather, to provide an understandable description of the systems and methods. While the specification concludes with claims defining the features of the systems and methods that are regarded as novel, it is believed that the systems and methods will be better understood from a consideration of the following description in conjunction with the drawing figures, in which like reference numerals are carried forward.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Alternate embodiments may be devised without departing from the spirit or the scope of the invention. Additionally, well-known elements of exemplary embodiments of the systems and methods will not be described in detail or will be omitted so as not to obscure the relevant details of the systems and methods.

Before the systems and methods are disclosed and described, it is to be understood that the terminology used herein is for the purpose of describing particular embodiments only and is not intended to be limiting. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element. The terms "including" and/or "having," as used herein, are defined as comprising (i.e., open language). The terms "a" or "an", as used herein, are defined as one or more than one. The term "plurality," as used herein, is defined as two or more than two. The term "another," as used herein, is defined as at least a second or more. The description may use the terms "embodiment" or "embodiments," which may each refer to one or more of the same or different embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact (e.g., directly coupled). However, "coupled" may also mean that two or more elements are not in direct contact with each other, but yet still cooperate or interact with each other (e.g., indirectly coupled).

For the purposes of the description, a phrase in the form "A/B" or in the form "A and/or B" or in the form "at least one of A and B" means (A), (B), or (A and B), where A and B are variables indicating a particular object or attribute. When used, this phrase is intended to and is hereby defined as a choice of A or B or both A and B, which is similar to the phrase "and/or". Where more than two variables are present in such a phrase, this phrase is hereby defined as including only one of the variables, any one of the variables, any combination of any of the variables, and all of the variables, for example, a phrase in the form "at least one of A, B, and C" means (A), (B), (C), (A and B), (A and C), (B and C), or (A, B and C).

Relational terms such as first and second, top and bottom, and the like may be used solely to distinguish one entity or action from another entity or action without necessarily requiring or implying any actual such relationship or order between such entities or actions. The description may use perspective-based descriptions such as up/down, back/front, and top/bottom. Such descriptions are merely used to facilitate the discussion and are not intended to restrict the application of disclosed embodiments. Various operations may be described as multiple discrete operations in turn, in a manner that may be helpful in understanding embodiments; however, the order of description should not be construed to imply that these operations are order dependent.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

Herein various embodiments of the systems and methods are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Described now are exemplary embodiments. Referring now to the figures of the drawings in detail and first, particularly to FIGS. 1 to 4, 13, and 14, there is shown a first exemplary embodiment of a master cylinder for a hydraulic bicycle disk brake.

The master cylinder 100 has a brake lever 110 and a pressure piece 120, which are all rotatably mounted on a housing 107 through a bearing journal 111. The brake lever 110 has a bearing journal support 112 by which the brake lever 110 is rotatably mounted about the bearing journal 111. The pressure piece 120 has a bearing journal support 121 by which the pressure piece 120 is rotatably mounted about the bearing journal 111.

The master cylinder 100 has a handlebar support 105 and a counterpart 106, by which the master cylinder 100 can be attached to a non-illustrated handlebar of a two-wheeler in a way known to the person skilled in the art. A hydraulic line 101 is attached to the housing 107 by a pressure line connection piece 103. A sleeve 102 is provided on the hydraulic line 101.

In the housing 107, a cylinder 140 is provided in which a piston 150 is movably disposed.

The pressure piece 120 has a piston abutment surface 124 that abuts against the piston 150 and through which the power is transmitted to the piston 150 upon actuation.

The handle width of the master cylinder 100 can be adjusted by a handle width adjustment device 180 by adjusting an angular distance between the pressure piece 120 and the brake lever 110, both of which are mounted about a common bearing journal 111.

The handle width adjustment device 180 has a journal 181 that is screwed through its external thread 185 into the brake lever 110, i.e., into an internal thread 115 provided in the brake lever 110. The journal 181 has an actuation head 184 at the outer end thereof. At the inner end thereof, the journal 181 has an abutment surface 183 that rests on a journal abutment surface 123 of the pressure piece 120. The brake lever 110 is biased by a spring 182 disposed in a spring support 122 provided in the pressure piece 120 in a direction of the pressure piece 120 such that the journal abutment surface 183 rests on the journal abutment surface 123 of the pressure piece 120. By rotating the journal 181, it is possible to adjust the relative position thereof in the brake lever 110 and, thus, the angular distance between the brake lever 110 and the pressure piece 120, which determines the handle width.

Figures 19, 20:
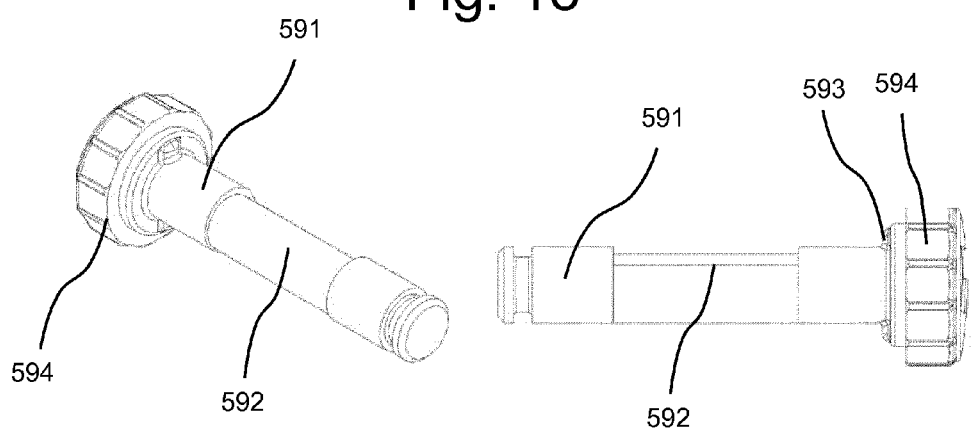
FIG. 19 is a perspective view of a journal of a pressure point adjustment device of the master cylinder of FIGS. 17 and 18.
FIG. 20 is a side elevational view of the journal of FIG. 19.

The pressure point of the master cylinder 100 can be adjusted through a pressure point adjustment device 190 by turning the brake lever 110 jointly with the pressure piece 120 in relation to the housing 107 about the bearing journal 111. The pressure point adjustment device 190 has a journal 191 that is composed in accordance with the journal 591 shown in FIGS. 19 and 20 and which has a contour portion 592 and an actuation head 594. To adjust the pressure point, the journal 191 can be rotated at the actuation head 194. A middle portion of the journal 191 has a contour portion 192 against which the pressure piece 120 abuts. By rotating the journal 191, the angle of the pressure piece 120 is, thus, changed to change the zero point position of the piston 150 in the cylinder 140 and, thus, the pressure point of the master cylinder 100.

When the contour portion 192 is made to move the piston 150 in its rest position into the cylinder 140 to such an extent that the connection between the compensating chamber 170 and the pressure chamber 130 is interrupted, the system operates as a closed system. Because this is usually to be avoided in open systems, the journal 191 has locking cams that are formed like the locking cams 593 shown in FIGS. 19 and 20, for example. They mesh with corresponding contours in the housing 107 to ensure that the pressure point cannot be adjusted so that the connection between the pressure chamber 130 and the compensating chamber 170 is interrupted in the rest position of the piston 150.

The handle width is simultaneously adjusted with the pressure point adjustment. Because the handle width is adjusted by the handle width adjustment device 180 irrespective of the pressure point (because the pressure piece 120 does not co-rotate but only the brake lever 110 does), an adjustment of the handle width can be compensated by the handle width adjustment apparatus 180.

The cylinder 140 has a cylinder wall 141 and a cylinder bottom 142. A hollow connecting piece 143 is provided at the cylinder bottom 142, the interior of which contains the compensating chamber 170 for the hydraulic medium of the system.

The pressure chamber 130 encloses the connecting piece 143, i.e., based on the cylinder 140, the pressure chamber 130 is confined inwards by the outer wall of the connecting piece 143 and outwards by the inner wall of the cylinder wall 141. In the area of the cylinder bottom 142, the pressure chamber 130 has an opening to a line 104 that is connected to the hydraulic line 101 that runs to a non-illustrated slave cylinder (e.g. brake caliper of a hydraulic bicycle disk brake).

The piston 150 has a piston bottom 151 and a piston wall 152. The piston 150 thus has the shape of a cup, wherein the connecting piece 143 plunges into the piston 150. A return spring 144 is provided in the space formed by the connecting piece 143 and the piston 150 and meshes at the piston 150 with a spring support 155 that is provided at the inner side of the piston bottom 151.

In contrast to springs used in the known master cylinders, the return spring 144 has a relatively small diameter. A thus resulting easier release of the return spring 144 is not problematic in the present configuration because the return spring 144 is very well guided in the connecting piece 143 and the return spring 144 does not border on the gasket area because it is disposed in the compensating chamber 170 (inner space of the connecting piece 143).

In the area of the spring support 155, the piston 150 has a guiding portion 157. The scraper 169 is provided on the other side of the piston 150. The piston 150 is guided in the cylinder 140 by the guiding portion 157 and the scraper 169. The piston 150 has a taper 156 between the guiding portion 157 and the scraper 169. This taper 156 has a sufficient distance from the cylinder 140, and, therefore, the surface of the piston 150 does not have to be made completely smooth in the area of the taper 156. All in all, good sliding properties and a small sliding friction result from this configuration.

The guiding ratio of the piston 150, i.e., the ratio of the length of the distance from the guiding portion 157 to the scraper 169 to the diameter of the piston 150 (or the ratio of the piston length to the piston diameter) is approximately 3/4. This is clearly less than in the case of known master cylinders for hydraulic bicycle disk brakes where the guiding ratio is approximately 2.

According to variant embodiments, the piston could additionally or alternatively be guided on the inner side by a guiding device on the connecting piece.

When the master cylinder 100 is actuated, the piston 150 is moved in the cylinder 140 in the direction of the cylinder bottom 142 against the force of the return spring 144, wherein the connecting piece 143 plunges deeper into the piston 150.

At the end of the connecting piece 143, several connecting openings 171 are provided to connect the pressure chamber 130 to the compensating chamber 170. The compensating chamber 170 comprises the inner space 172 in the connecting piece 143. The inner space 172 can already suffice as the compensating chamber 170 under certain circumstances. Relatively large compensating volumes are usually provided. In the embodiment shown, the inner space 172 is connected through a line 173, which also provides compensating volumes, to a container 174 that is disposed laterally at the housing 107. In the container 174, a bellows 175 is provided that adapts itself to the volume of hydraulic liquid in the container. The container 174 is closed by a cover 176.

At the front end, a gasket support 153 is provided at the piston wall 152 and a gasket 160 is disposed therein. A scraper support 154 is provided on the other side of the piston wall 152, viewed in the axial direction, and the scraper 169 is disposed therein. The scraper support 154 is located approximately at the height of the piston bottom 151.

The gasket 160 has a mounting portion 163 by which the gasket 160 is disposed in the gasket support 153.

The gasket 160 is disposed in the axial direction of the piston 150 and below the piston 150. The pressure chamber 130 is, thus, confined by the cylinder bottom 142, the cylinder wall 141, the connecting piece 143, and the gasket 160. In contrast to known master cylinders, the hydraulic liquid does not contact the piston 150 but only the gasket 160 disposed on the front side or the end of the piston wall 152.

The gasket 160 has an outer sealing lip 161 that seals the pressure chamber 130 and the compensating chamber 170 against the environment. Thus, the outer sealing lip 161 of the gasket 160 has the function of the secondary gasket.

The gasket 160 has an inner sealing lip 162 that interrupts the connection between the pressure chamber 130 and the compensating chamber 170 as soon as the inner sealing lip 162 travels over the connecting openings 171. Thus, the inner sealing lip 162 of the gasket 160 has the function of the primary gasket. The inner sealing lip 162 is made substantially thinner than the outer sealing lip 161. The material thickness of the inner sealing lip 162 is approximately 30 to 70%, in particular, 40 to 60%, and, further, approximately 50% of the material thickness of the outer sealing lip 161. Alternatively or additionally, the gasket 160 can be made of several materials so as to make the inner sealing lip 162 more resilient than the outer sealing lip 161. Such a development has the advantage that, in the case of a pressure drop in the pressure chamber, the hydraulic liquid is earlier drawn off the compensating chamber into the pressure chamber so as to prevent gas from the environment from flowing in.

FIGS. 5 to 8 show another exemplary embodiment of a master cylinder for a hydraulic bicycle disk brake that corresponds substantially to the master cylinder described in conjunction with FIGS. 1 to 4 and 13 to 14. Equal or corresponding parts are designated by corresponding reference signs that are, however, increased by 100. Only the differences of the master cylinder of FIGS. 5 to 8 are described below with respect to the embodiments of FIGS. 1 to 4 and 13 to 14. Furthermore, the description of the other exemplary embodiments and, in particular, the description of the exemplary embodiment of FIGS. 1 to 4 and 13 to 14 is incorporated by reference herein.

In the master cylinder 200 shown in FIGS. 5 to 8, the compensating chamber 270 is disposed between the cylinder 240 and the handlebar support 205. As a result, the inner space 272 of the connecting piece 243 opens directly into the container 274. The cover 276 is disposed laterally.

FIGS. 9 to 12 show another exemplary embodiment of a master cylinder 300 for a hydraulic bicycle disk brake that corresponds substantially to the master cylinders described in conjunction with FIGS. 1 to 4 and 13 to 14 or 5 to 8. Equal or corresponding parts are designated by corresponding reference signs that are, however, increased by 100 or 200. Only the differences of the master cylinder of FIGS. 9 to 12 are described below with respect to the embodiment of FIGS. 1 to 4 and 13 to 14 or 5 to 9. Furthermore, the description of the other exemplary embodiments and, in particular, the description of the exemplary embodiment of FIGS. 1 to 4 and 13 to 14 is incorporated by reference herein.

In the master cylinder 300 shown in FIGS. 9 to 12, the compensating chamber 370 is disposed between the cylinder 340 and the handlebar support 305. As a result, the inner space 372 of the connecting piece 343 opens directly into the container 374. The cover 376 is disposed laterally.

Figure 15:
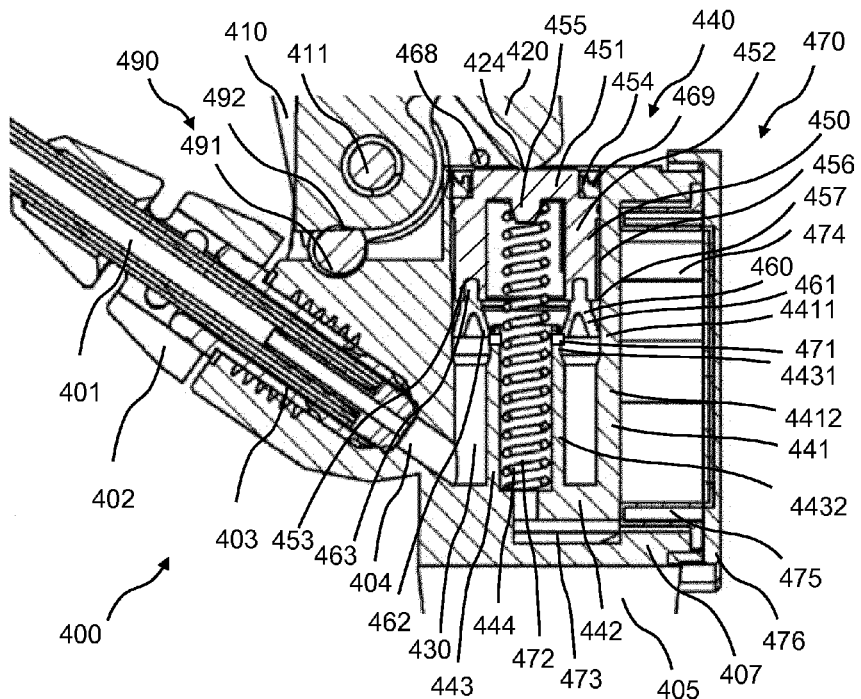
FIG. 15 a fragmentary, enlarged, cross-sectional view of a portion of an exemplary embodiment of a master cylinder.

FIG. 15 shows a detail of a portion of a master cylinder 400 according to a further exemplary embodiment that substantially corresponds to the master cylinder described in conjunction with FIGS. 1 to 4 and 13 to 14. Equal or corresponding parts are designated by corresponding reference signs increased by 300. Only the differences of the embodiment of FIG. 15 are described with respect to the embodiment of FIGS. 1 to 4 and 13 to 14. Furthermore, the description of the other exemplary embodiments and, in particular, the description of the exemplary embodiment of FIGS. 1 to 4 and 13 to 14 is incorporated by reference herein. In particular, reference is made to FIGS. 2 to 3, the views of which correspond to the view of the exemplary embodiment of FIG. 15.

The exemplary embodiment of FIG. 15 differs from the exemplary embodiment in FIGS. 1 to 4 and 13 to 14 in that the pressure chamber 430 between the cylinder wall 441 and the connecting piece 443 is reduced in cross-section, i.e., the pressure chamber initially has a larger cross-section after traveling over the connecting opening 471 by the gasket 460. After about a further distance of 1 mm, the cylinder wall 441 changes from an area 4411 having a larger inner diameter into an area 4412 having a smaller inner diameter. At the same time or somewhat staggered, the connecting piece 443 changes from an area 4431 having a smaller outer diameter into an area 4432 having a larger outer diameter. As a result, it is possible to initially displace relatively more hydraulic liquid due to the larger cross-section of the pressure chamber when the piston movement is small, and, therefore, the venting clearance between the brake disk and the brake pads can be overcome more rapidly and the brake pads can abut against the brake pad more rapidly. As soon as the gasket 460 travels upon a further actuation of the master cylinder 400 over the transition to the area 4412 having a smaller inner diameter and the area 4432 having a larger outer diameter, the hydraulic transmission becomes larger, and, therefore, a larger force can be exerted in the actual braking process. As a result of the embodiment, the hydraulic transmission between the starting of the brake pads and the actual braking can be changed by about 5 to 20%. Such a major change is possible because a change is made in both the inner wall (outer wall of the connecting piece 443) and the outer wall (inner wall of the cylinder 440) of the pressure chamber 430.

Of course, it is also possible in the other embodiments to vary the diameter of the pressure chamber in a way described in conjunction with the master cylinder of FIG. 15 so as to obtain a non-linear characteristic line.

FIGS. 16 to 20 show a master cylinder 500 for a hydraulic bicycle disk brake according to a further exemplary embodiment that corresponds substantially to the master cylinders described in conjunction with FIGS. 1 to 4 and 13 to 14 or 5 to 8 or 9 to 12 or FIG. 15. Equal or corresponding parts are designated by corresponding reference signs increased, however, by 100, 200, 300 or 400. Only the differences of the master cylinder of FIGS. 16 to 20 are described below with respect to the embodiment of FIGS. 1 to 4 and 13 to 14 or 5 to 9 or 9 to 12 or 15. Furthermore, the description of the other exemplary embodiments and, in particular, the description of the exemplary embodiment of FIGS. 1 to 4 and 13 to 14 is incorporated by reference herein.

Figure 16:
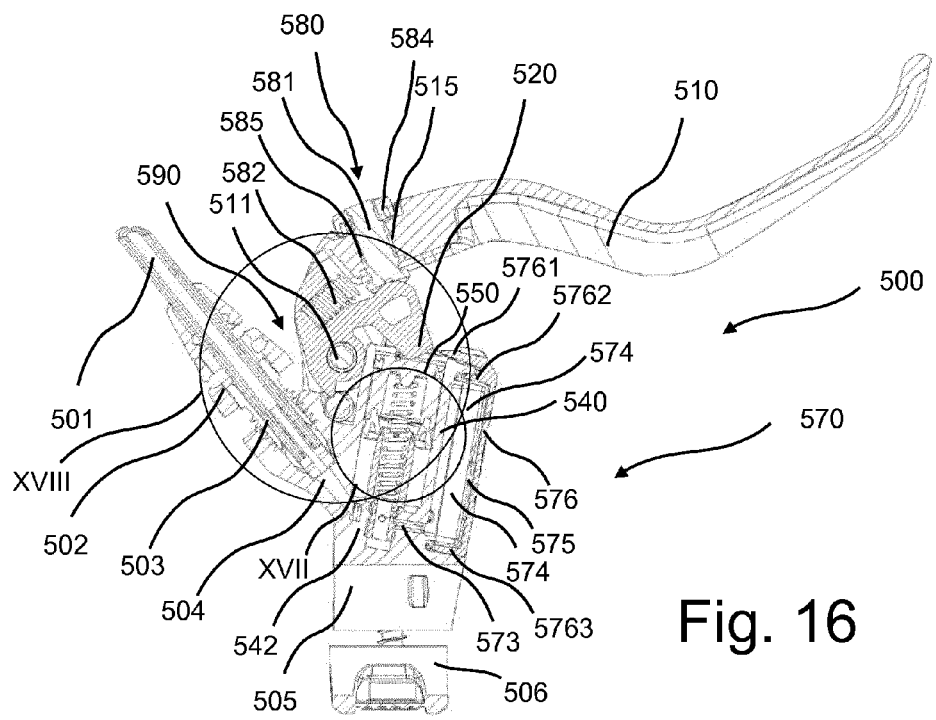
FIG. 16 shows a fragmentary, cross-sectional view of an exemplary embodiment of a master cylinder.
Figure 17:
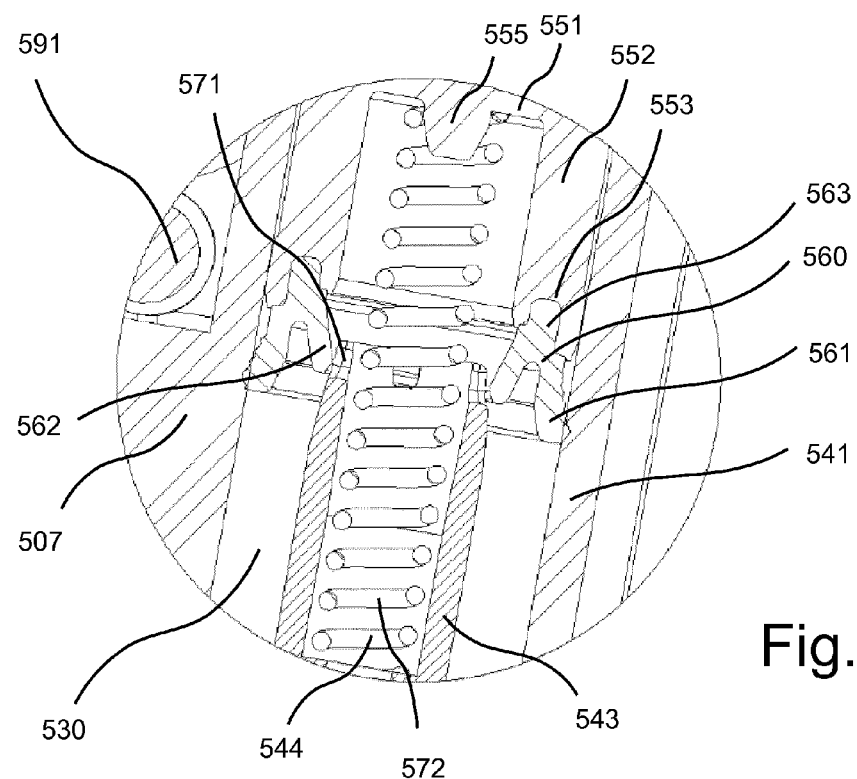
FIG. 17 is a fragmentary, enlarged, cross-sectional view of a portion of the master cylinder in circle XVII of FIG. 16.
Figure 18:
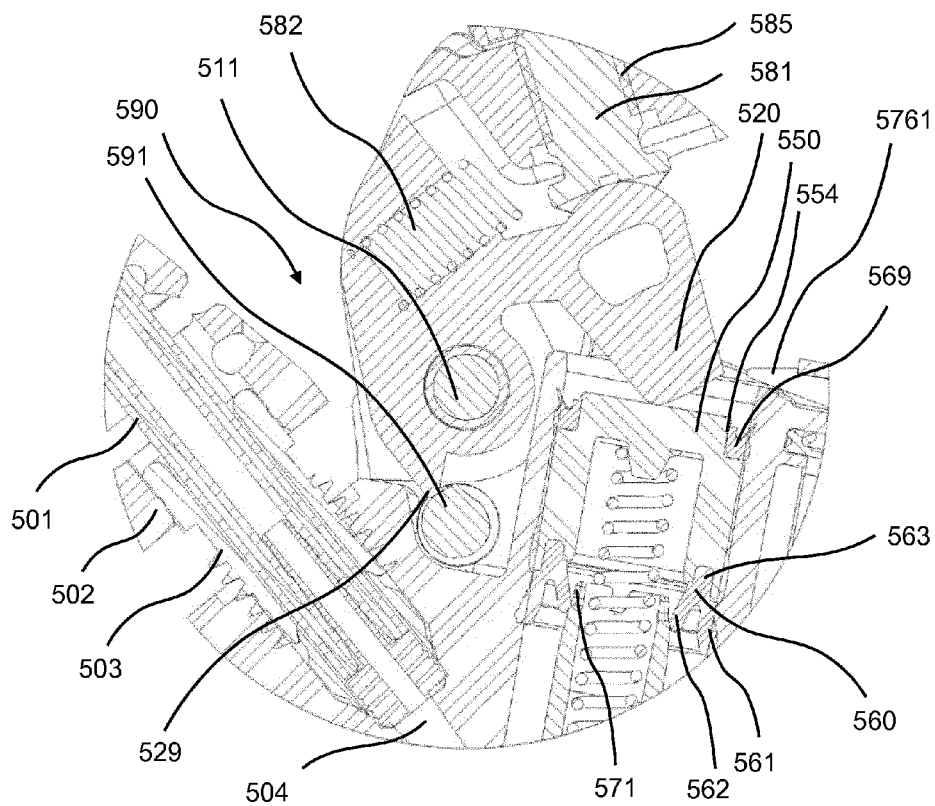
FIG. 18 is a fragmentary, enlarged, cross-sectional view of a portion of the master cylinder in circle XVIII of FIG. 16.

In the master cylinder 500 of FIGS. 16 to 20, the cylinder 540 is inclined at an angle of approximately 10° towards the end of the non-illustrated handlebar, i.e. the cylinder 540 is not perpendicular to the handlebar (the handlebar axis is defined by the handlebar support 505 and the counterpart 506) but is inclined by approximately 10 degrees to the left (in FIG. 16).

The cover 576 has a projection 5761 that protrudes beyond the piston 550 and, thus, serves as a path confinement of the piston 550 when the cover 576 closes the container 574.

The cover 576 must be attached to the master cylinder 500 before the master cylinder 500 is mounted on the handlebar by the handlebar support 505 and the counterpart 506. The cover 576 has two locking portions 5762 and 5763 by which the cover 576 locks in place at the housing 507 of the master cylinder 500. In this connection, the bellows 575 is secured in the container 574 and the piston 550 is prevented from moving out of the cylinder 540 by the projection 5761. Due to the assembly of the master cylinder 500 at the handlebar, the cover 576 rests on the handlebar and is held by it in its position on the container 574.

The sealing lips 561, 562 of the gasket 560 are disposed with a slight displacement in this embodiment, i.e., the outer sealing lip 561 is disposed in the direction of the cylinder axis approximately 1 mm closer to the cylinder bottom 542.

According to an alternative exemplary embodiment, the cover can have, instead of the locking portion that is close to the handlebar, a hinge projection by which the cover is hinged in the housing and then can be folded up. On the other side thereof, a locking portion and a locking device can be provided to secure the cover in its position.

Figure 21:
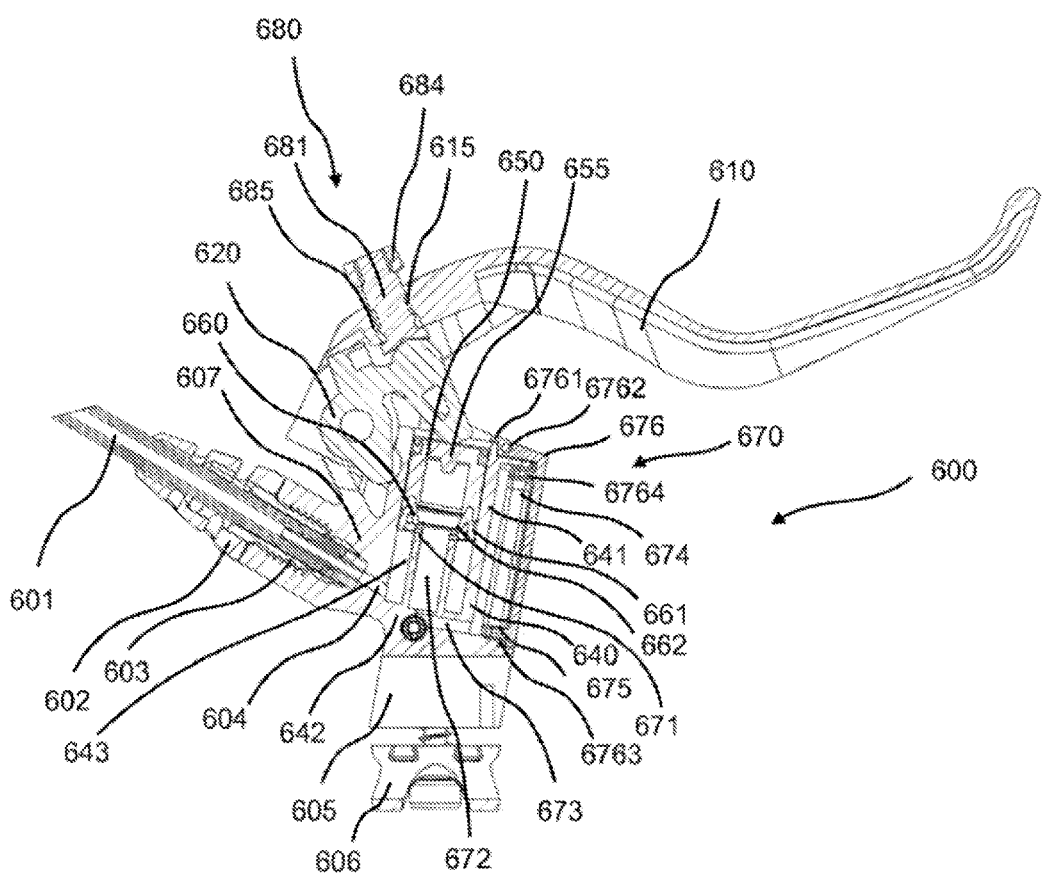
FIG. 21 is a fragmentary, cross-sectional view of an exemplary embodiment of a master cylinder.

FIG. 21 shows a master cylinder 600 for a hydraulic bicycle disk brake according to a further exemplary embodiment that corresponds substantially to the master cylinders described in conjunction with FIGS. 1 to 4 and 13 to 14 or 5 to 8 or 9 to 12 or 15 or 16 to 20. Equal or corresponding parts are designated by corresponding reference signs that are, however, increased by 100 or 200 or 300 or 400 or 500. Only the differences of the master cylinder of FIG. 21 are described below with respect to the above mentioned embodiments of FIGS. 1 to 4 and 13 to 14 or 15 or 5 to 9 or 5 or 16 to 20. Furthermore, the description of the other exemplary embodiments and, in particular, the description of the exemplary embodiment of FIGS. 16 to 20 is incorporated by reference herein.

In the embodiment shown in FIG. 21, the cover 676 has, in place of the locking portion that is closed to the handlebar (see embodiment of FIGS. 16 to 20), a hinge projection 6763 by which the cover 676 is hinged in the housing 607 and can then be folded up. On the opposite side, i.e., the upper side in FIG. 21, the cover 676 has a support projection 6764 by which the cover 676 is fixed to the housing 607. In this connection, the bellows 675 is simultaneously forced or held in the container 674. To fix the cover 676 in this position, a locking pin 6762 is provided. On this side, the cover 676 has a projection 6761 by which the piston 650 is fixed in the cylinder 640.

Figure 22:
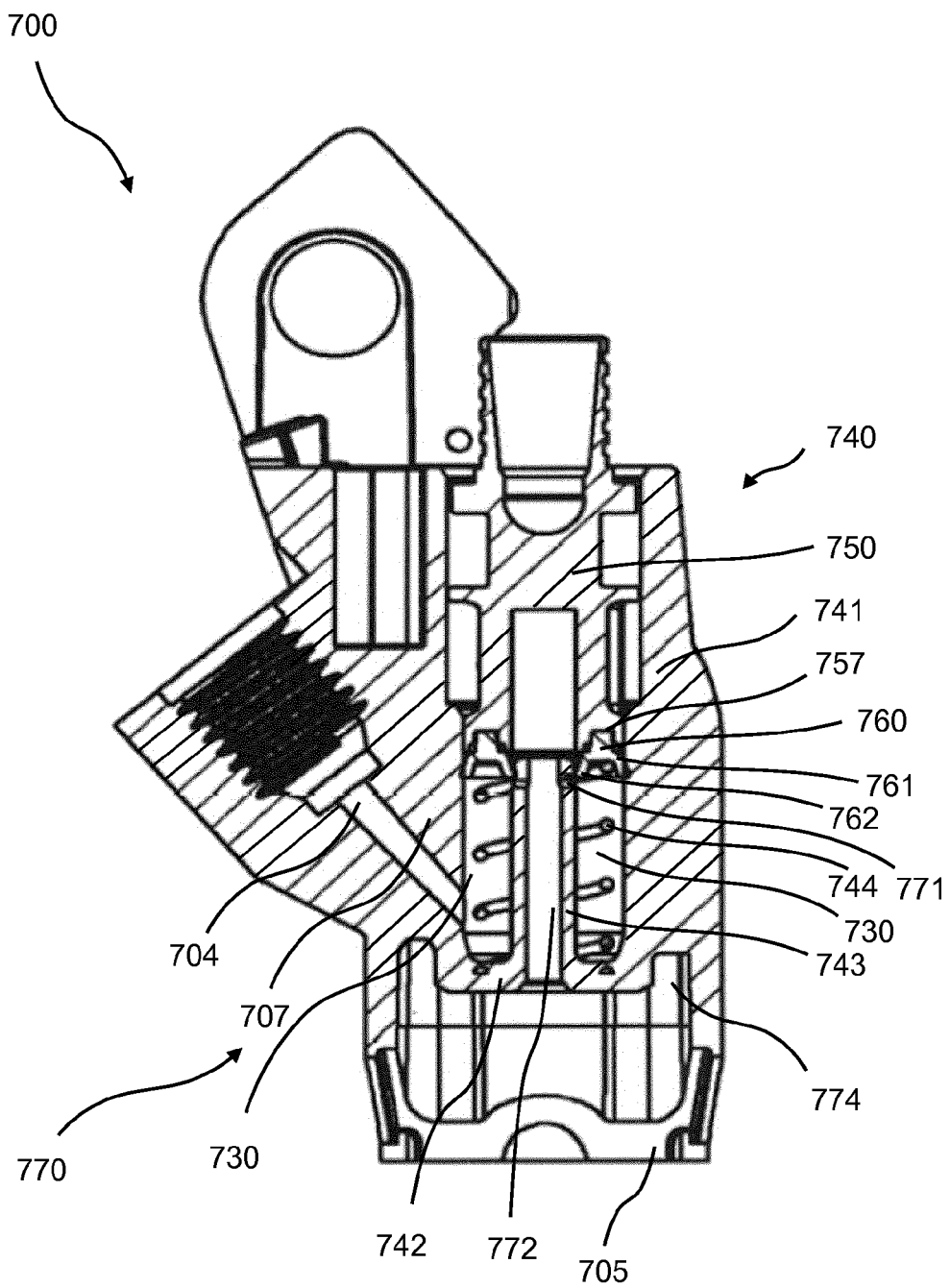
FIG. 22 is an enlarged, cross-sectional view of an exemplary embodiment of a master cylinder.

FIG. 22 shows a master cylinder 700 for a hydraulic bicycle disk brake according to a further exemplary embodiment that corresponds substantially to the master cylinders described in conjunction with FIGS. 1 to 4 and 13 to 14 or 5 to 8 or 9 to 12 or 15 or 16 to 20 or 21. Equal or corresponding parts are designated by corresponding reference signs that are, however, increased by 100 or 200 or 300 or 400 or 500 or 600. Only the differences of the master cylinder of FIG. 22 are described below with respect to the above mentioned embodiments of FIGS. 1 to 4 and 13 to 14 or 15 or 5 to 9 or 5 or 16 to 20 or 21. The description of the other exemplary embodiments is incorporated by reference herein.

In contrast to the master cylinders shown in FIGS. 1 to 21 and described above, the spring 744 of the master cylinder 700 shown in FIG. 22 is disposed outside the connecting piece 743 and not within the connecting piece 743. The container 774 borders on the non-illustrated handlebar.

Figure 23:
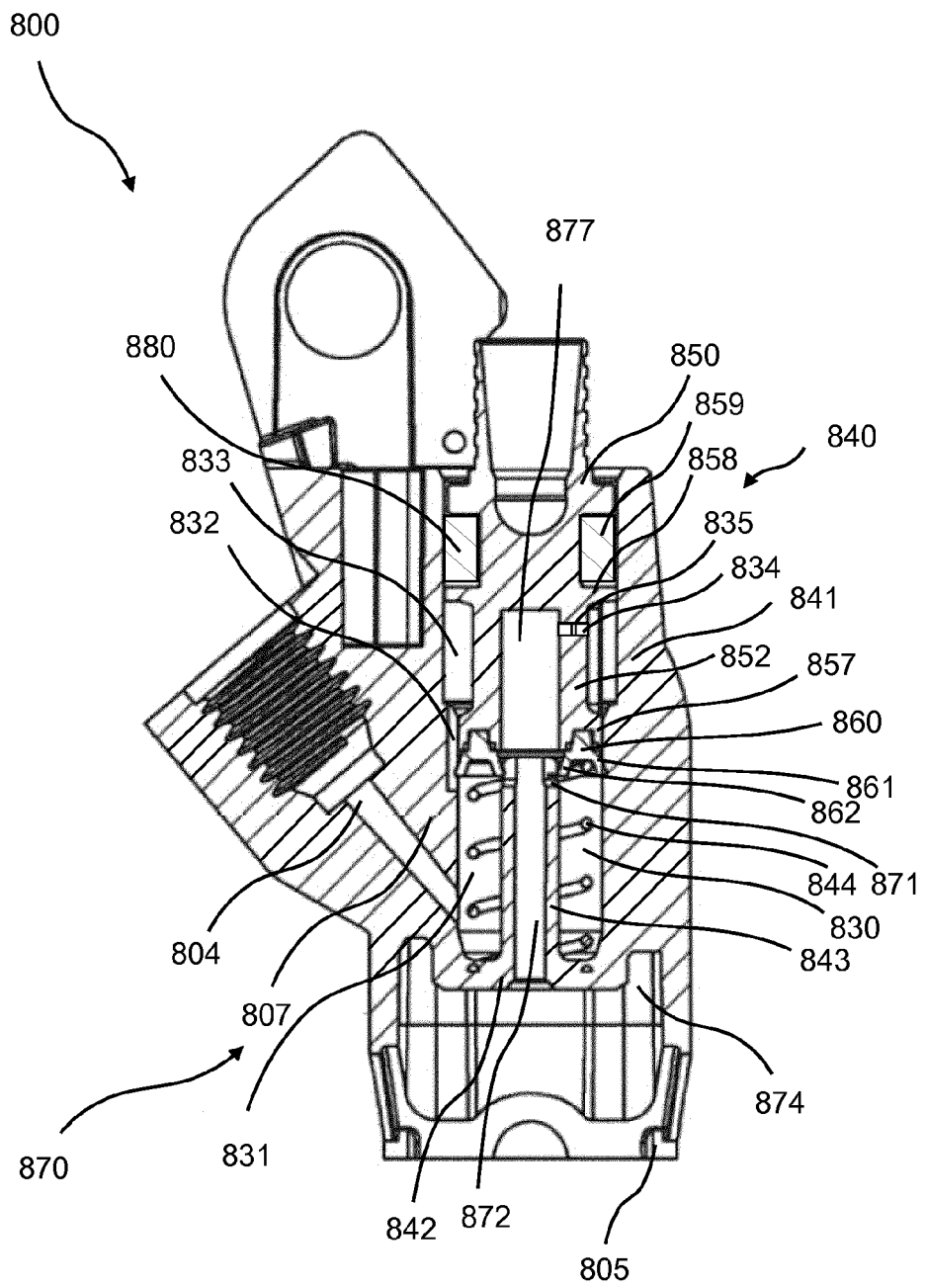
FIG. 23 is an enlarged, cross-sectional view of an exemplary embodiment of a master cylinder.

FIG. 23 shows a master cylinder 800 for a hydraulic bicycle disk brake according to a further exemplary embodiment that corresponds substantially to the master cylinders described in conjunction with FIGS. 1 to 4 and 13 to 14 or 5 to 8 or 9 to 12 or 15 or 16 to 20 or 21 or 22. Equal or corresponding parts are designated by corresponding reference signs that are, however, increased by 100 or 200 or 300 or 400 or 500 or 600 or 700. Only the differences of the master cylinder of FIG. 23 are described below with respect to the above mentioned embodiments of FIGS. 1 to 4 and 13 to 14 or 15 or 5 to 9 or 5 or 16 to 20 or 21. Furthermore, the description of the other exemplary embodiments and, in particular, the description of the exemplary embodiment of FIG. 22 is incorporated by reference herein.

In the master cylinder 800 shown in FIG. 23, the piston 850 has a collar 858 that has a larger diameter than that of the guiding portion 857 at which the gasket 860 is disposed.

A gasket support 859 is provided behind the collar 858 and a further gasket 880 is provided therein.

The pressure chamber 830 includes a high-pressure chamber 831 and a low-pressure chamber 833. The high-pressure chamber 831 is connected to the low-pressure chamber through a channel 832. The further gasket 880 seals the low-pressure chamber 832 against the environment.

The compensating chamber 870 has an inner space 877 that is formed in the inner space of the piston 850. The low-pressure chamber 833 is connected to the inner space 835 through a connecting opening 834. A valve 835 is provided in the connecting opening 834. The valve 835 is made to interrupt a flow from the low-pressure chamber 833 into the inner space up to a certain pressure. For example, the valve 835 can be a pressure relief valve.

According to an alternative exemplary embodiment, the valve 835 can have, in addition to the function of a pressure relief valve, also the function of a check valve to enable a flow from the inner space 877 into the low-pressure chamber 833. For example, the check valve and the pressure relief valve here can be disposed in separate connecting openings each connecting the low-pressure chamber 833 to the inner space 877.

The channel 832 is formed in the cylinder wall 841 such that the channel 832 is closed by the outer sealing lip 861 as soon as the outer sealing lip 861 of the gasket 860 travels over the channel 832. In this connection, the gasket 860 is disposed and made so that, upon the actuation of the master cylinder 800, the sealing lip 862 initially travels over the connecting opening 871 to interrupt the connection between the pressure chamber 830 and the compensating chamber 870. Therefore, pressure can build up in the system to move the brake pads to the brake disk of the slave cylinder when the master cylinder 800 is actuated. As long as in the further actuation, the outer sealing lip 861 has not yet traveled over channel 832, the piston 850 displaces the hydraulic medium with the full cross-section that is defined by the diameter of the collar 858 minus the cross-sectional area of the connecting piece 843. Due to the large area, the brake pads can rapidly overcome the venting clearance. As soon as the channel 832 is traveled over, the effective cross-section is reduced to the cross-section of the high-pressure chamber 831. The pressure in the low-pressure chamber 833 increases until it exceeds the opening pressure of the valve 835 in the connecting opening 834. Thus, hydraulic medium can flow from the low-pressure chamber 833 into the inner space 877 that is connected to the inner space 872 and the container 874. At the same time, the piston 850 can move further in the cylinder 840 in the actuation direction, and, therefore, a larger pressure can build up in the high-pressure chamber 831, which acts on the slave cylinder through the line 804. Due to the better transmission (smaller cross-section, longer distance), a greater force can be exerted during the braking operation. Due to this configuration, the venting clearance can be rapidly overcome in the embodiment of FIG. 15 and then a large braking force can be exerted.

When the brake is released, the hydraulic medium displaced from the low-pressure chamber 833 is replenished from the inner space 872 through the connecting opening 871 and/or from the inner space 877 through the valve 835 and the connecting opening 834.

In all embodiments, a non-illustrated leg spring can be provided about the bearing journal 111, 211, 311, 411 or 511 to bias the brake lever in a direction of the pressure piece or piston. In the case of a fall, the brake lever can be released from the pressure piece or the piston without damaging the power transmission path. The advantage of this is that the brake remains functioning because the brake lever can be folded away counter to its conventional actuation direction without damaging the brake.

It is noted that various individual features of the inventive processes and systems may be described only in one exemplary embodiment herein. The particular choice for description herein with regard to a single exemplary embodiment is not to be taken as a limitation that the particular feature is only applicable to the embodiment in which it is described. All features described herein are equally applicable to, additive, or interchangeable with any or all of the other exemplary embodiments described herein and in any combination or grouping or arrangement. In particular, use of a single reference numeral herein to illustrate, define, or describe a particular feature does not mean that the feature cannot be associated or equated to another feature in another drawing figure or description. Further, where two or more reference numerals are used in the figures or in the drawings, this should not be construed as being limited to only those embodiments or features, they are equally applicable to similar features or not a reference numeral is used or another reference numeral is omitted.

The foregoing description and accompanying drawings illustrate the principles, exemplary embodiments, and modes of operation of the systems and methods. However, the systems and methods should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the systems and methods as defined by the following claims.

What is claimed is:

1. A master cylinder for a hydraulic brake, which comprises:
    a compensating chamber;
    a cylinder in which a piston is disposed so as to be movable, the piston having a rest position;
    a pressure chamber that is disposed in the cylinder and is connected to the compensating chamber via at least one connecting opening;
    a pressure point adjusting device designed and disposed such that the connection between the compensating chamber and the pressure chamber can be interrupted in the rest position of the piston; and
    a gasket for interrupting the connection between the pressure chamber and the compensating chamber.

2. The master cylinder for a hydraulic brake according to claim 1, wherein the gasket seals the compensating chamber against the environment when the gasket has interrupted the connection between the pressure chamber and the compensating chamber.

3. The master cylinder for a hydraulic brake according to claim 1, wherein the piston includes a piston wall that extends from a piston bottom and at the end of which the gasket is disposed.

4. The master cylinder for a hydraulic brake according to claim 1, wherein:
    the piston is disposed in the cylinder so as to be movable counter to the force of a return spring; and
    in the cylinder, a hollow connecting piece is disposed that plunges into the piston.

5. The master cylinder according to claim 1, wherein:
    a hollow connecting piece that plunges into the piston is disposed in the cylinder; and
    the pressure chamber is defined by a cylinder wall of the cylinder, a cylinder bottom of the cylinder, the connecting piece and the gasket.

6. The master cylinder according to claim 1, wherein the gasket has two sealing lips.

7. The master cylinder according to claim 4, wherein an outer diameter of the connecting piece is smaller in an area that is closer to the piston than the outer diameter of the connecting piece than in an area that is farther away from the piston.

8. The master cylinder according to claim 1, wherein an inner diameter of a cylinder wall of the cylinder is larger in an area that is closer to the piston than the inner diameter of the cylinder wall in an area that is farther away from the piston.

9. The master cylinder for a hydraulic brake according to claim 1, wherein:
    the compensating chamber has a section;
    the piston is disposed in the cylinder so as to be movable counter to the force of a return spring; and
    the return spring is disposed in the section of the compensating chamber.

10. The master cylinder for a hydraulic brake according to claim 1, wherein:
    the piston is disposed in the cylinder so as to be movable counter to the force of a return spring; and
    a ratio of a length of the piston to a diameter of the piston is approximately 3/6 to 4/3.

11. The master cylinder according to claim 1, wherein the pressure point adjusting device has a locking device.

12. The master cylinder according to claim 11, wherein the locking device is designed and disposed such that the connection between the compensating chamber and the pressure chamber is not interrupted in the rest position when the locking device is in a locked position.

13. The master cylinder for a hydraulic brake, according to claim 1, wherein:
    the compensating chamber has a cover; and
    the cover has a projection that protrudes beyond the piston.

* * * * *